United States Patent
Burger et al.

(10) Patent No.: US 9,946,548 B2
(45) Date of Patent: *Apr. 17, 2018

(54) AGE-BASED MANAGEMENT OF INSTRUCTION BLOCKS IN A PROCESSOR INSTRUCTION WINDOW

(71) Applicant: Microsoft Technology Licensing, LLC, Redmond, WA (US)

(72) Inventors: Douglas C. Burger, Bellevue, WA (US); Aaron Smith, Seattle, WA (US); Jan Gray, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 99 days.

This patent is subject to a terminal disclaimer.

(21) Appl. No.: 14/752,747

(22) Filed: Jun. 26, 2015

(65) Prior Publication Data
US 2016/0378502 A1     Dec. 29, 2016

(51) Int. Cl.
*G06F 9/30* (2006.01)
*G06F 9/38* (2018.01)

(52) U.S. Cl.
CPC ............ *G06F 9/3836* (2013.01); *G06F 9/381* (2013.01); *G06F 9/3802* (2013.01); *G06F 9/3855* (2013.01); *G06F 9/3859* (2013.01)

(58) Field of Classification Search
None
See application file for complete search history.

(56) References Cited

U.S. PATENT DOCUMENTS

| 5,142,631 A | 8/1992 | Murray et al. |
| 5,333,280 A | 7/1994 | Ishikawa et al. |

(Continued)

FOREIGN PATENT DOCUMENTS

| CN | 101344843 A | 1/2009 |
| CN | 102096579 A | 6/2011 |

(Continued)

OTHER PUBLICATIONS

Bakhoda, et al., "Microsoft Research—E2", Published on: Mar. 23, 2015 Available at: http://research.microsoft.com/en-us/projects/e2/ (2 pages total).

(Continued)

*Primary Examiner* — William B Partridge
(74) *Attorney, Agent, or Firm* — Mark K. Young; Mayer & Williams PC

(57) ABSTRACT

A processor core in an instruction block-based microarchitecture includes a control unit that explicitly tracks instruction block state including age or priority for current blocks that have been fetched from an instruction cache. Tracked instruction blocks are maintained in an age-ordered or priority-ordered list. When an instruction block is identified by the control unit for commitment, the list is checked for a match and a matching instruction block can be refreshed without re-fetching from the instruction cache. If a match is not found, an instruction block can be committed and replaced based on either age or priority. Such instruction state tracking typically consumes little overhead and enables instruction blocks to be reused and mispredicted instructions to be skipped to increase processor core efficiency.

21 Claims, 15 Drawing Sheets

(56) References Cited

U.S. PATENT DOCUMENTS

| | | | |
|---|---|---|---|
| 5,333,283 A | 7/1994 | Emma et al. |
| 5,363,495 A | 11/1994 | Fry et al. |
| 5,615,350 A | 3/1997 | Hesson et al. |
| 5,790,822 A | 8/1998 | Sheaffer et al. |
| 5,796,997 A | 8/1998 | Lesartre et al. |
| 5,799,167 A | 8/1998 | Lesartre |
| 5,845,103 A | 12/1998 | Sodani et al. |
| 5,903,750 A | 5/1999 | Yeh et al. |
| 5,933,642 A | 8/1999 | Greenbaum et al. |
| 5,943,501 A | 8/1999 | Burger et al. |
| 5,983,337 A | 11/1999 | Mahalingaiah et al. |
| 5,999,737 A | 12/1999 | Srivastava |
| 6,016,399 A | 1/2000 | Chang |
| 6,044,222 A | 3/2000 | Simons et al. |
| 6,058,438 A | 5/2000 | Diehl et al. |
| 6,061,776 A | 5/2000 | Burger et al. |
| 6,112,019 A | 8/2000 | Chamdani et al. |
| 6,161,170 A | 12/2000 | Burger et al. |
| 6,164,841 A | 12/2000 | Mattson et al. |
| 6,167,491 A | 12/2000 | McAlpine |
| 6,185,675 B1 | 2/2001 | Kranich et al. |
| 6,212,622 B1 | 4/2001 | Witt |
| 6,275,919 B1 | 8/2001 | Johnson |
| 6,279,101 B1 | 8/2001 | Witt et al. |
| 6,286,135 B1 | 9/2001 | Santhanam |
| 6,301,673 B1 | 10/2001 | Foster et al. |
| 6,360,309 B1 | 3/2002 | Iadonato et al. |
| 6,453,344 B1 | 9/2002 | Ellsworth et al. |
| 6,493,820 B2 | 12/2002 | Akkary et al. |
| 6,513,109 B1 | 1/2003 | Gschwind et al. |
| 6,523,110 B1 | 2/2003 | Bright et al. |
| 6,529,922 B1 | 3/2003 | Hoge |
| 6,779,100 B1 | 8/2004 | Keltcher et al. |
| 6,851,043 B1 | 2/2005 | Inoue |
| 6,877,059 B2 | 4/2005 | Solomon et al. |
| 6,918,032 B1 | 7/2005 | Abdallah et al. |
| 6,934,254 B2 | 8/2005 | Brown et al. |
| 6,934,828 B2 | 8/2005 | Parthasarathy et al. |
| 6,957,320 B2 | 10/2005 | Senter et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegel et al. |
| 7,032,217 B2 | 4/2006 | Wu |
| 7,036,036 B2 | 4/2006 | Vorbach et al. |
| 7,051,187 B2 | 5/2006 | Garg et al. |
| 7,051,188 B1 | 5/2006 | Kubala et al. |
| 7,152,155 B2 | 12/2006 | McIlvaine et al. |
| 7,207,038 B2 | 4/2007 | Bicsak et al. |
| 7,210,127 B1 | 4/2007 | Rangachari |
| 7,228,402 B2 | 6/2007 | Rychlik et al. |
| 7,284,100 B2 | 10/2007 | Slegel et al. |
| 7,299,458 B2 | 11/2007 | Hammes |
| 7,308,320 B2 | 12/2007 | Miyamori |
| 7,310,722 B2 | 12/2007 | Moy et al. |
| 7,380,038 B2 | 5/2008 | Gray |
| 7,392,524 B2 | 6/2008 | Ault et al. |
| 7,453,899 B1 | 11/2008 | Vaida et al. |
| 7,490,224 B2 | 2/2009 | Abernathy et al. |
| 7,526,637 B2 | 4/2009 | Jung et al. |
| 7,571,284 B1 | 8/2009 | Olson et al. |
| 7,587,578 B2 | 9/2009 | Isobe |
| 7,624,254 B2 | 11/2009 | Smith et al. |
| 7,631,170 B2 | 12/2009 | Dowling |
| 7,664,940 B2 | 2/2010 | Conklin et al. |
| 7,676,650 B2 | 3/2010 | Ukai |
| 7,685,354 B1 | 3/2010 | Hetherington et al. |
| 7,720,991 B1 | 5/2010 | Parent et al. |
| 7,779,213 B2 | 8/2010 | Ferren et al. |
| 7,802,073 B1 | 9/2010 | Cheng et al. |
| 7,805,574 B2 | 9/2010 | Bell, Jr. et al. |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,877,586 B2 | 1/2011 | Levitan et al. |
| 7,917,733 B2 | 3/2011 | Kazuma |
| 7,958,396 B2 | 6/2011 | Chitsaz et al. |
| 8,010,953 B2 | 8/2011 | Gschwind |
| 8,032,734 B2 | 10/2011 | Svendsen et al. |
| 8,055,881 B2 | 11/2011 | Burger et al. |
| 8,055,885 B2 | 11/2011 | Nakashima |
| 8,127,119 B2 | 2/2012 | Burger et al. |
| 8,151,092 B2 | 4/2012 | Altman et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,234,635 B2 | 7/2012 | Isshiki et al. |
| 8,250,555 B1 | 8/2012 | Lee et al. |
| 8,250,556 B1 | 8/2012 | Lee et al. |
| 8,266,413 B2 | 9/2012 | Hwu et al. |
| 8,290,994 B2 * | 10/2012 | Allalouf ............... G06F 3/0604 707/821 |
| 8,321,850 B2 | 11/2012 | Bruening et al. |
| 8,341,639 B2 | 12/2012 | Lewis |
| 8,380,964 B2 * | 2/2013 | Bishop ................. G06F 9/3855 712/214 |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,473,724 B1 | 6/2013 | Kenville et al. |
| 8,510,596 B1 | 8/2013 | Gupta et al. |
| 8,533,436 B2 | 9/2013 | Fryman et al. |
| 8,555,038 B2 | 10/2013 | Olson et al. |
| 8,589,662 B2 | 11/2013 | Altman et al. |
| 8,589,892 B2 | 11/2013 | Fournier et al. |
| 8,612,698 B2 | 12/2013 | Lopez et al. |
| 8,612,726 B2 | 12/2013 | Sharawi et al. |
| 8,677,105 B2 | 3/2014 | Abdallah |
| 8,756,605 B2 | 6/2014 | Aingaran et al. |
| 8,817,793 B2 | 8/2014 | Mushano |
| 8,909,941 B1 | 12/2014 | Trimberger |
| 8,930,678 B2 | 1/2015 | Madduri et al. |
| 9,021,241 B2 | 4/2015 | Burger et al. |
| 9,043,769 B2 | 5/2015 | Vorbach |
| 9,053,292 B2 | 6/2015 | Abdallah |
| 2003/0004683 A1 | 1/2003 | Nemawarkar |
| 2003/0012225 A1 | 1/2003 | Banerjee et al. |
| 2003/0065835 A1 | 4/2003 | Maergner et al. |
| 2003/0101208 A1 | 5/2003 | Chauvel et al. |
| 2003/0149862 A1 | 8/2003 | Kadambi |
| 2004/0123078 A1 | 6/2004 | Hum et al. |
| 2004/0139299 A1 | 7/2004 | Busaba et al. |
| 2005/0076194 A1 | 4/2005 | Kanapathippillai et al. |
| 2006/0020769 A1 | 1/2006 | Herrell et al. |
| 2006/0020944 A1 | 1/2006 | King et al. |
| 2006/0031702 A1 | 2/2006 | Jardine et al. |
| 2006/0041875 A1 | 2/2006 | Peri et al. |
| 2006/0075207 A1 | 4/2006 | Togawa et al. |
| 2006/0136915 A1 | 6/2006 | Aingaran et al. |
| 2006/0259739 A1 | 11/2006 | Asal et al. |
| 2006/0259740 A1 | 11/2006 | Hahn et al. |
| 2006/0282624 A1 | 12/2006 | Yokota |
| 2007/0050557 A1 | 3/2007 | Ferren et al. |
| 2007/0055827 A1 | 3/2007 | Tsien |
| 2007/0074011 A1 | 3/2007 | Borkar et al. |
| 2007/0113171 A1 | 5/2007 | Behrens et al. |
| 2007/0157006 A1 | 7/2007 | Jourdan et al. |
| 2007/0162906 A1 | 7/2007 | Chandhoke |
| 2007/0192540 A1 | 8/2007 | Gara et al. |
| 2007/0239965 A1 | 10/2007 | Lewites et al. |
| 2007/0255980 A1 | 11/2007 | Endo et al. |
| 2008/0046621 A1 | 2/2008 | Okino et al. |
| 2008/0109668 A1 | 5/2008 | Atkinson |
| 2008/0126750 A1 | 5/2008 | Sistla |
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |

(56) References Cited

U.S. PATENT DOCUMENTS

| | | |
|---|---|---|
| 2009/0013153 A1 | 1/2009 | Hilton |
| 2009/0013160 A1 | 1/2009 | Burger et al. |
| 2009/0150657 A1 | 6/2009 | Gschwind et al. |
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |
| 2009/0299966 A1 | 12/2009 | Schneider |
| 2010/0070958 A1 | 3/2010 | Takagi |
| 2010/0082947 A1 | 4/2010 | Tramm et al. |
| 2010/0146209 A1 | 6/2010 | Burger et al. |
| 2010/0262807 A1 | 10/2010 | Burky et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0252258 A1 | 10/2011 | Im et al. |
| 2012/0030451 A1 | 2/2012 | Pong et al. |
| 2012/0079102 A1 | 3/2012 | Damodaran et al. |
| 2012/0124345 A1 | 5/2012 | Denman et al. |
| 2012/0216012 A1 | 8/2012 | Vorbach et al. |
| 2012/0246448 A1 | 9/2012 | Abdallah |
| 2012/0246450 A1 | 9/2012 | Abdallah |
| 2012/0303933 A1 | 11/2012 | Manet et al. |
| 2012/0311306 A1 | 12/2012 | Mushano |
| 2013/0024676 A1 | 1/2013 | Glew et al. |
| 2013/0191817 A1 | 7/2013 | Vorbach |
| 2013/0198499 A1 | 8/2013 | Dice et al. |
| 2013/0339470 A1 | 12/2013 | Jeswani et al. |
| 2014/0033217 A1 | 1/2014 | Vajda et al. |
| 2014/0082327 A1 | 3/2014 | Ghose |
| 2014/0095837 A1 | 4/2014 | Plotnikov et al. |
| 2014/0136822 A1 | 5/2014 | Suggs et al. |
| 2014/0173222 A1 | 6/2014 | Alapati et al. |
| 2014/0173262 A1 | 6/2014 | Chheda et al. |
| 2014/0181475 A1 | 6/2014 | Abdallah |
| 2014/0189287 A1 | 7/2014 | Plotnikov et al. |
| 2014/0195787 A1 | 7/2014 | Scalabrino et al. |
| 2014/0201507 A1 | 7/2014 | Jayaseelan et al. |
| 2014/0281389 A1 | 9/2014 | Loktyukhin et al. |
| 2014/0281416 A1 | 9/2014 | Abdallah |
| 2014/0281424 A1 | 9/2014 | Bobba et al. |
| 2014/0281434 A1 | 9/2014 | Madriles et al. |
| 2014/0281622 A1 | 9/2014 | Wagh et al. |
| 2014/0282607 A1 | 9/2014 | O'Sullivan et al. |
| 2014/0298336 A1 | 10/2014 | Taniuchi |
| 2014/0317387 A1 | 10/2014 | Abdallah |
| 2014/0331236 A1 | 11/2014 | Mitra et al. |
| 2014/0351524 A1 | 11/2014 | Natarajan et al. |
| 2014/0372736 A1 | 12/2014 | Greenhalgh |
| 2014/0373022 A1 | 12/2014 | Chan |
| 2015/0019921 A1 | 1/2015 | Chen et al. |
| 2015/0067214 A1 | 3/2015 | Henry et al. |
| 2015/0067662 A1 | 3/2015 | Palalau |
| 2015/0074355 A1 | 3/2015 | Sampathkumar |
| 2015/0095628 A1 | 4/2015 | Yamada et al. |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0199272 A1 | 7/2015 | Goel et al. |
| 2016/0055004 A1 | 2/2016 | Grochowski et al. |
| 2016/0179546 A1 | 6/2016 | Yamada et al. |
| 2016/0328237 A1 | 11/2016 | Di et al. |
| 2016/0378479 A1 | 12/2016 | Burger |
| 2016/0378483 A1 | 12/2016 | Burger et al. |
| 2016/0378484 A1 | 12/2016 | Burger |
| 2016/0378488 A1 | 12/2016 | Burger et al. |
| 2016/0378491 A1 | 12/2016 | Burger et al. |
| 2016/0378499 A1 | 12/2016 | Burger et al. |
| 2016/0378502 A1 | 12/2016 | Burger |
| 2016/0378661 A1 | 12/2016 | Gray et al. |
| 2017/0083343 A1 | 3/2017 | Burger |

FOREIGN PATENT DOCUMENTS

| | | |
|---|---|---|
| CN | 102306094 A | 1/2012 |
| CN | 104310225 A | 1/2015 |
| EP | 0583089 A2 | 2/1994 |
| EP | 0992894 A1 | 4/2000 |
| EP | 1039374 A2 | 9/2000 |
| EP | 1102163 A2 | 5/2001 |
| EP | 2527972 A2 | 11/2012 |
| WO | 0125903 A1 | 4/2001 |
| WO | 2004001587 A2 | 12/2003 |
| WO | 2006102664 A2 | 9/2006 |
| WO | 2009006607 A1 | 1/2009 |
| WO | 2011031361 A1 | 3/2011 |
| WO | 2013081556 A1 | 6/2013 |
| WO | 2013095635 A1 | 6/2013 |
| WO | 2014014216 A1 | 1/2014 |
| WO | 2014193878 A1 | 12/2014 |
| WO | 2015069583 A1 | 5/2015 |

OTHER PUBLICATIONS

Budiu, et al., "Optimizing Memory Accesses for Spatial Computation", In Proceedings of First International Symposium on Code Generation and Optimization, Mar. 23, 2003, (13 pages total).

Saravana, at al., "TRIPS: A Distributed Explicit Data Graph Execution (EDGE) Microprocessor", In Proceedings of IEEE HotChips Symposium on High-Performance Chips, Aug. 2007, (13 pages total).

Maher, et al., "The Good Block: Hardware/Software Design for Composable, Block-Atomic Processors", In Proceedings of the 15th Workshop on Interaction between Compilers and Computer Architectures, Feb. 12, 2011, (8 pages total).

"Control Flow Graphs and Loop Optimization", Published on: Nov. 7, 2014, Available at: https://engineering.purdue.edu/~milind/ece468/2014fall/lecture-09.pdf (38 pages total).

Smith, Aaron Lee, "Explicit Data Graph Compilation", In Doctoral Dissertation, Dec. 2009, (3 pages total).

"Cash: A C to Layout Compiler", Retrieved Date: Apr. 8, 2015, Available at: http://www.cs.cmu.edu/afs/cs/academic/class/15745-s07/www/papers/cash-journal.pdf (29 pages total).

Budiu, et al., "Pegasus: An Efficient Intermediate Representation", In Technical Report, Apr. 2002, (20 pages total).

Xue, et al., "Partial Dead Code Elimination on Predicated Code Regions", In Journal of Software—Practice & Experience, vol. 36, No. 15, Dec. 2006, (32 pages total).

"Loop-Invariant Code Motion with Unsafe Operations", Retrieved on: Apr. 8, 2015, Available at: http://cs.stackexchange.com/questions/28054/loop-invariant-code-motion-with-unsafe-operations (4 pages total).

Cooper, et al., "Loop Invariant Code Motion—Classical Approaches", Retrieved on: Apr. 8, 2015, Available at: https://www.google.co.in/url?sa=t&rct=j&q=&esrc=s&source=web&cd=2&ved=0CCMQFjAB&url=http%3A%2F%2Fbooksite.elsevier.com%2F9780120884780%2FGraduate_Lecture_Slides%2FOptimizations%2F23CM-Classic.ppt&ei=9OAkVfDWLYiPuATrp4GIDA&usg=AFQjCNEYXCHF8IV0gQqYXmVfxBPu9Rm4hg&sig2=JSR7hwvDuzeMbKGTHxUzRg (19 pages total).

Nethercote, et al., "Self-Evaluating Compilation Applied to Loop Unrolling", In Technical Report TR-06, Feb. 2006, (17 pages total).

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, (12 pages total).

Desikan et al., "Scalable Selective Re-Execution for EDGE Architectures," In Proceedings of the 11th International Conference on Architectural Support for Programming Languages and Operating Systems, Oct. 9, 2004, (13 pages total).

Govindan et al., "Scaling Power and Performance via Processor Composability," IEEE Transaction on Computers, No. 1, Aug. 2014, (14 pages total).

Gulati et al., "Multitasking Workload Scheduling on Flexible Core Chip Multiprocessors," In Proceedings of the Computer Architecture News, vol. 36, Issue 2, May 2008, (10 pages total).

(56) References Cited

OTHER PUBLICATIONS

Keckler et al., "Tera-Op Reliable Intelligently Adaptive Processing System (Trips)," In AFRL-IF-WP-TR-2004-1514, document dated Apr. 2004, (29 Pages total).

Microsoft Research, "E2," document downloaded on Apr. 10, 2015 from http://research.microsoft.com/en-us/projects/e2/ (2 pages total).

Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, (12 pages total).

Sankaralingam et al., "Exploiting ILP, TLP, and DLP with Polymorphous TRIPS Architecture," In Proceedings of the 30th Annual International Symposium on Computer Architecture, Jun. 9, 2003, (12 pages total).

Smith et al., "Compiling for EDGE Architectures," In Proceedings of International Symposium on Code Generation and Optimization, Mar. 26, 2006, (11 pages total).

Smith, "TRIPS Application Binary Interface (ABI) Manual," Technical Report TR-05-22, Department of Computer Sciences, The University of Texas at Austin, Technical Report TR-05-22, document marked Oct. 10, 2006, (16 pages total).

"International Preliminary Report on Patentability Issued in PCT Patent Application No. PCT/US2014/039654", Mailed Date: Aug. 17, 2015, 11 Pages total.

"International Search Report and Written Opinion Issued in PCT Application No. PCT/US2016/038849", Mailed Date: Sep. 30, 2016, (15 Pages total).

"International Search Report and Written Opinion Issued in PCT Application No. PCT/US2016/038850", Mailed Date: Sep. 22, 2016, (12 Pages total).

Behnam Robatmili, et al., "Strategies for Mapping Dataflow Blocks to Distributed Hardware", In the proceedings of the 41st IEEE/ACM International Symposium on Microarchitecture, Nov. 8, 2008, (12 Pages total).

"International Search Report and Written Opinion Issued in PCT Application No. PCT/US2016/038851", Mailed Date: Sep. 27, 2016, 11 Pages.

"International Search Report and Written Opinion Issued in PCT Application No. PCT/US2016/038852", Mailed Date: Sep. 23, 2016, (14 Pages total).

Sankaralingam, et al., "Distributed Microarchitectural Protocols in the TRIPS Prototype Processor", in Proceedings of 39th Annual IEEE/ACM International Symposium on Microarchitecture, Dec. 9, 2006, (12 pages total).

Putnam, et al., "Dynamic Vectorization in the E2 Dynamic Multicore Architecture", In Proceedings of ACM SIGARCH Computer Architecture News, vol. 38, Issue 4, Sep. 2010, (6 pages total).

"TRIPS (The Tera-op, Reliable, Intelligently adaptive Processing System)", Published on: Oct. 29, 2005 Available at: http://www.cs.utexas.edu/users/cart/trips/ (1 page total).

Smith, et al., "Compiling for EDGE Architectures", In Proceedings of the 4th International Symposium on Code Generation and Optimization, Mar. 26, 2006, (11 pages total).

Smith, Aaron, "Explicit Data Graph Compilation", In PhD Thesis, Dec. 2009, (1 page total).

Gebhart, et al., "An Evaluation of the TRIPS Computer System", In Proceedings of the 14th international conference on Architectural support for programming languages and operating systems, Mar. 7, 2009, (2 pages total).

Burger, et al., "Scaling to the End of Silicon with EDGE Architectures", In Proceedings of Computer, vol. 37, Issue 7, Jul. 2004, pp. 44-55 (12 pages total).

Sankaralingam, et al., "TRIPS: A Polymorphous Architecture for Exploiting ILP, TLP, and DLP", In Proceedings of ACM Transactions on Architecture and Code Optimization, vol. 1, Issue 1, Mar. 2004, pp. 62-93. (32 pages total).

Jones, et al., "A Comparison of Data Prefetching on an Access Decoupled and Superscalar Machine", In Proceedings of Thirtieth Annual IEEE/ACM International Symposium on Microarchitecture, Dec. 1, 1997, (6 pages total).

Pericas, et al., "A Decoupled KILO—Instruction Processor", In Proceedings of the Twelfth International Symposium on High-Performance Computer Architecture, Feb. 11, 2006, (12 pages total).

Melvin, et al., "Enhancing Instruction Scheduling with a Block-Structured ISA", In International Journal of Parallel Programming, vol. 23, No. 3, Jun. 1, 1995, pp. 221-243 (23 pages total).

Reinmany, et al., "Optimizations Enabled by a Decoupled Front-End Architecture", In Proceedings of IEEE Transactions on computers, vol. 50 Issue 4, Apr. 1, 2001, (32 pages total).

Nagarajan ey al., "Static Placement, Dynamic Issue (SPDI) Scheduling for EDGE Architectures", In Proceedings of 13th International Conference on Parallel Architecture and Compilation Techniques, Sep. 29, 2004, (11 pages total).

Duric, et al., "EVX: Vector Execution on Low Power EDGE Cores", In Proceedings of the Conference on Design, Automation & Test in Europe Conference and Exhibition, Mar. 24, 2014, (4 pages total).

Pengfei, et al., "M5 Based EDGE Architecture Modeling", In Proceedings of IEEE International Conference on Computer Design, Oct. 3, 2010, (8 pages total).

Duric, et al., "Dynamic-vector Execution on a General Purpose EDGE Chip Multiprocessor", In International Conference on Embedded Computer Systems: Architectures, Modeling, and Simulation, Jul. 17, 2014, (8 pages total).

Junier, et al., "Impact of Instruction Cache Replacement Policy on the Tightness of WCET Estimation", In Proceedings of the 2nd Junior Researcher Workshop on Real-Time Computing, in Conjunction to RTNS, Oct. 16, 2008, (4 pages total).

Wilhelm, Reinhard, "Determining Bounds on Execution Times", In Proceedings of Embedded Systems Design and Verification—vol. 1 of the Embedded Systems Handbook, Apr. 7, 2015, (33 pages total).

Gupta, et al., "Erasing Core Boundaries for Robust and Configurable Performance", In Proceedings of 43rd Annual IEEE/ACM International Symposium on Microarchitecture, Dec. 4, 2010, (12 pages total).

Kim, et al., "Composable Lightweight Processors", In 40th Annual IEEE/ACM International Symposium on Microarchitecture, Dec. 1, 2007, (13 pages total).

Govindaraju, et al., "DySER: Unifying Functionality and Parallelism Specialization for Energy-Efficient Computing", In IEEE Micro, vol. 32, Issue 5, Sep. 2012, (14 pages total).

Kocabas, et al., "Enhancing an Embedded Processor Core with a Cryptographic Unit for Performance and Security", In Proceedings of the 4th International Conference on Reconfigurable Computing and FPGAs, Dec. 3, 2008, (6 pages total).

Essen, et al., "Energy-Efficient Specialization of Functional Units in a Coarse-Grained Reconfigurable Array", In Proceedings of the 19th ACM/SIGDA International Symposium on Field Programmable Gate Arrays, Feb. 27, 2011, (4 pages total).

Benson, et al., "Design, Integration and Implementation of the DySER Hardware Accelerator", In IEEE 18th International Symposium on High Performance Computer Architecture, Feb. 25, 2012, (12 pages).

"International Search Report & Written Opinion for PCT Patent Application No. PCT/US2014/039654", Mailed Date: Aug. 26, 2014, (13 pages total).

Park, et al., "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380. (11 pages total).

Bouwens, et al., "Architecture Enhancements for the ADRES Coarse-Grained Reconfigurable Array", In Proceedings of the 3rd International Conference on High Performance Embedded Architectures and Compilers, Jan. 27, 2008, pp. 66-81. (16 pages total).

Duric, et al., "ReCompac: Reconfigurable Compute Accelerator", In Proceedings of the International Conference on Reconfigurable Computing and FPGAs, Dec. 9, 2013, (4 pages total).

(56) References Cited

OTHER PUBLICATIONS

"Second Written Opinion Issued in PCT Patent Application No. PCT/US2014/039654", Mailed Date: Mar. 3, 2015, (7 pages total).
Mei, et al., "ADRES: An Architecture with Tightly Coupled VLIW Processor and Coarse-Grained Reconfigurable Matrix", In Proceedings of 13th International Conference on Field-Programmable Logic and Applications, Sep. 2003, pp. 61-70 (10 pages total).
"Second Written Opinion Issued in PCT Application No. PCT/US2016/038852", dated May 24, 2017, 5 Pages.
Jones, et al., "A Comparison of Data Prefetching on an Access Decoupled and Superscalar Machine", In Proceedings of the Thirtieth Annual IEEE/ACM International Symposium on Microarchitecture, Dec. 3, 1997, 6 Pages.
Pericas, et al., "A Decoupled KILO-Instruction Processor", In The Twelfth International Symposium on High-Performance Computer Architecture, Feb. 11, 2006, 12 Pages.
Coons, et al., "A Spatial Path Scheduling Algorithm for EDGE Architectures", In The Proceedings of 12th International Conference on Architectural Support for Programming Languages and Operating Systems, Oct. 23, 2006, 12 Pages.
Gebhart, et al., "An Evaluation of the TRIPS Computer System", In The Proceedings of the 14th International Conference on Architecture Support for Programming Languages and Operating System, Mar. 7, 2009, 14 Pages.
"Cash: A C to Layout Compiler", Retrieved from <<http://www.cs.cmu.edu/afs/cs/academic/class/15745-s07/www/papers/cash-journal.pdf>>, Retrieved on: Apr. 8, 2015, 29 Pages.
Li, et al., "Code Layout Optimization for Defensiveness and Politeness in Shared Cache", In 43rd International Conference on Parallel Processing, Sep. 9, 2014, 11 Pages.
Huang, et al., "Compiler-Assisted Sub-Block Reuse", In Technical Report No. ARCTiC 00-03, Laboratory for Advanced Research in Computing Technology and Compilers, May 2000, 21 Pages.
Smith, et al., "Compiling for EDGE Architectures", In Proceedings of the 4th International Symposium on Code Generation and Optimization, Mar. 26, 2006, 11 Pages.
Kim, et al., "Composable Lightweight Processors", In Proceedings of the 40th Annual IEEE/ACM International Symposium on Microarchitecture, Dec. 1, 2007, pp. 381-393.
"Control Flow Graphs and Loop Optimization", Retrieved from <<https://engineering.purdue.edu/~milind/ece468/2014fall/lecture-09.pdf>>, Nov. 7, 2014, 38 Pages.
Nagarajan, Ramadass, "Design and Evaluation of a Technology-Scalable Architecture for Instruction-Level Parallelism", The Dissertation Presented to the Faculty of the Graduate School of The University of Texas at Austin in Partial Fulfillment of the Requirements for the Degree of Doctor of Philosophy, May, 2007, 260 Pages.
Zmily, et al., "Improving Instruction Delivery with a Block-Aware ISA", In Proceedings of 11th International Euro-Par Conference on Parallel Processing, Aug. 30, 2005, pp. 530-539.
Govindan, et al., "Trips: A Distributed Explicit Data Graph Execution (EDGE) Microprocessor", In Proceedings of IEEE Hot Chips 19 Symposium, Aug. 19, 2007, 13 Pages.
Uhrig, et al., Department of Computer Science, University of Augsburg "The Two-dimensional Superscalar GAP Processor Architecture", International Journal on Advances in Systems and Measurements, vol. 3, No. 1 & 2, pp. 71-81, 2010 (11 pages total).
Tamches, et al., "Dynamic Kernel Code Optimization", In Proceedings of the 3rd Workshop on Binary Translation, Jun. 2001, 10 Pages.
Smith, et al., "Trips Application Binary Interface (ABI) Manual", In Technical Report TR-05-22, Department of Computer Sciences, Oct. 10, 2006, 16 Pages.
Gray, et al., "Towards an Area-Efficient Implementation of a High ILP EDGE Soft Processor: Comparing Out-of-Order Dataflow Instruction Scheduler Designs", In Proceedings of the 2014 22nd IEEE Symposium on Field Programmable Custom Computing Machines, May 11, 2014, 1 Page.
Maher, et al., "The Good Block: Hardware/Software Design for Composable, Block-Atomic Processors", In Proceedings of 15th Workshop on Interaction between Compilers and Computer Architectures, Feb. 12, 2011, 8 Pages.
Keckler, et al., "Tera-Op Reliable Intelligently Adaptive Processing System (Trips)", In AFRL-IF-WP-TR-2004-1514 (Stinfo Final Report), Apr. 2004, 29 Pages.
Robatmili, et al., "Strategies for Mapping Dataflow Blocks to Distributed Hardware", In the Proceedings of the 41st IEEE/ACM International Symposium on Microarchitecture, Nov. 8, 2008, pp. 23-34.
Sibi, et al., "Scaling Power and Performance via Processor Composability", In Technical Report No. TR-10-14, Department of Computer Sciences, 2010, 20 Pages.
Nethercote, et al., "Self-Evaluating Compilation Applied to Loop Unrolling", In Technical Report, TR-06-12, Feb. 2006, 17 Pages.
Sankaralingam, et al., "Exploiting ILP, TLP, and DLP with Polymorphous TRIPS Architecture", In Proceedings of 30th Annual International Symposium on Computer Architecture, Jun. 9, 2003, 12 Pages.
Robatmili, et al., "How to Implement Effective Prediction and Forwarding for Fusable Dynamic Multicore Architectures", In Proceedings of IEEE 19th International Symposium on High Performance Computer Architecture, Feb. 23, 2013, 12 Pages.
Nagarajan, et al., "Static Placement, Dynamic Issue (SPDI) Scheduling for EDGE Architectures", In Proceedings of the 13th International Conference on Parallel Architectures and Compilation Techniques, Sep. 29, 2004, 11 Pages.
Cooper, et al., "Loop Invariant Code Motion—Classical Approaches", Retrieved from <<http://booksite.elsevier.com/9780120884780/Graduate_Lecture_Slides/Optimizations/23CM-Classic.ppt, Retrieved on: Apr. 8, 2015, 19 Pages.
"Loop-Invariant Code Motion with Unsafe Operations", Retrieved from <<https://web.archive.org/web/20150927030042/https://cs.stackexchange.com/questions/28054/loop-invariant-code-motion-with-unsafe-operations>>, Retrieved Date: Apr. 8, 2015, 4 Pages.
Pengfei, et al., "M5 Based EDGE Architecture Modeling", In IEEE International Conference on Computer Design, Oct. 3, 2010, pp. 289-296.
Bakhoda, et al., "Microsoft Research—E2", Retrieved from <<https://web.archive.org/web/20150425065120/https://research.microsoft.com/en-us/projects/e2/>>, Apr. 10, 2015, 2 Pages.
Gulati, et al., "Multitasking Workload Scheduling on Flexible Core Chip Multiprocessors", In Proceedings of the 17th International Conference on Parallel Architectures and Compilation Techniques, Oct. 25, 2008, 10 Pages.
Reinman, et al., "Optimizations Enabled by a Decoupled Front-End Architecture", In Proceedings of IEEE Transactions on computers, vol. 50, Issue 4, Apr. 1, 2001, 32 Pages.
Budiu, et al., "Optimizing Memory Accesses for Spatial Computation", In Proceedings of First International Symposium on Code Generation and Optimization, Mar. 23, 2003, 13 Pages.
Xue, et al., "Partial Dead Code Elimination on Predicated Code Regions", In Journal of Software—Practice & Experience, vol. 36, Issue 15, Dec. 2006, pp. 1655-1686.
Budiu, et al., "Pegasus: An Efficient Intermediate Representation", In Technical Report: CMU-CS-02-107, Apr. 2002, 20 Pages.
Desikan, et al., "Scalable Selective Re-Execution for EDGE Architectures", In Proceedings of the 11th International conference on Architectural Support for Programming Languages and Operating Systems, Oct. 9, 2004, 13 Pages.
Govindan, et al., "Scaling Power and Performance via Processor Composability", In Journal, IEEE Transactions on Computers, vol. 63, Issue 8, Aug. 2014, 14 Pages.
"International Preliminary Report on Patentability Issued in PCT Application No. PCT/US2016/038852", dated Sep. 13, 2017, 9 Pages.
"Explicit Data Graph Execution", Retrieved From <<https://en.wikipedia.org/wiki/Explicit_Data_Graph_Execution>>Retrieved Date: Jun. 13, 2017, 5 Pages.
"How Many Clock Cycles does a RISCICISC Instruction Take to Execute?", Retrieved from <<http://electronics.stackexchange.com/

(56) References Cited

OTHER PUBLICATIONS questions/170551/how-many-clock-cycles-does-a-risc-cisc-instruction-take-to-execute>>, Retrieved Date: Aug. 24, 2015, 5 Pages.
"Intel® 64 Architecture Processor Topology Enumeration", In White Paper of Intel, Dec. 13, 2013, pp. 1-29.
"Load/store architecture", Retrieved From <<https://en.wikipedia.org/wiki/Load/store_architecture>>, Retrieved Date: Sep. 24, 2015, 1 Page.
Bush, Jeff, "Microarchitecture", Retrieved form <<https://github.com/jbush001/NyuziProcessor/wiki/Microarchitecture>>, Retrieved Date: Aug. 24, 2015, 7 Pages.
"Programmatic API for Building Resources", Retrieved From <<https://web.archive.org/web/20150706082232/https://jersey.java.net/nonav/documentation/2.0/resource-builder.html>>, Nov. 3, 2014, 3 Pages.
"Final Office Action Issued in U.S. Appl. No. 14/252,101", dated Jan. 12, 2017, 18 Pages.
"Non-Final Office Action Issued in U.S. Appl. No. 14/252,101", dated Jul. 7, 2016, 18 Pages.
"Non-Final Office Action Issued in U.S. Appl. No. 14/752,356", dated Mar. 21, 2017, 22 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.
"Non Final Office Action Issued in U.S. Appl. No. 14/752,636", dated Apr. 14, 2017, 15 Pages.
"Non Final Office Action Issued in U.S. Appl. No. 14/752,660", dated Apr. 6, 2017, 22 Pages.
"Non-Final Office Action Issued in U.S. Appl. No. 14/752,682", dated May 5, 2017, 10 Pages.
"Notice of Allowance Issued in U.S. Appl. No. 14/752,724", dated May 15, 2017, 15 Pages.
"Non-Final Office Action Issued in U.S. Appl. No. 14/752,727", dated Apr. 14, 2017, 11 Pages.
"Notice of Allowance Issued in U.S. Appl. No. 14/752,747", dated May 11, 2017, 14 Pages.
"Notice of Allowance Issued in U.S. Appl. No. 14/752,768", dated Apr. 28, 2017, 10 Pages.
"Non-Final Office Action Issued in U.S. Appl. No. 14/752,792", dated Apr. 11, 2017, 12 Pages.
"Non-Final Office Action Issued in U.S. Appl. No. 14/752,797", dated Apr. 18, 2017, 10 Pages.
Aasaraai, et al., "Design Space Exploration of Instruction Schedulers for Out-of-Order Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Appelbe, et al., "Hoisting Branch Conditions—Improving Super-Scalar Processor Performance", In Proceedings of the 8th International Workshop on Languages and Compilers for Parallel Computing, Aug. 10, 1995, 14 Pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Burger, et al., "Design and Implementation of the TRIPS EDGE Architecture", Retrieved From <<https://www.cs.utexas.edu/~trips/talks/trips_tutorial_6up_pdf>>, Jun. 4, 2005, 41 Pages.
Bush, et al., "Evaluation and Optimization of Signal Processing Kernels on the TRIPS Architecture", In Proceedings of 4th Annual Workshop on Optimizations for DSP and Embedded Systems, Mar. 2006, 10 Pages.
Cain, et al., "Memory Ordering: A Value-Based Approach", In Journal of IEEE Computer Society, vol. 24, Issue 1, Nov. 2004, pp. 110-117.
Carli, Roberto, "Flexible MIPS Soft Processor Architecture", In Technical Report of Massachusetts Institute of Technology, Jun. 16, 2008, pp. 1-49.
Chang, et al., "Cooperative Caching for Chip Multiprocessors", In Proceedings of the 33rd annual international Symposium on Computer Architecture, Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.
Chiu, et al., "Hyperscalar: A Novel Dynamically Reconfigurable Multi-core Architecture", In Proceedings of 39th International Conference on Parallel Processing, Sep. 13, 2010, 10 Pages.
Chrysos, et al., "Memory Dependence Prediction using Store Sets", In Proceedings of the 25th Annual International Symposium on Computer Architecture, Jun. 1998, pp. 142-153.
Coons, et al., "Feature Selection for Instruction Placement in an EDGE Architecture", Retrieved From <<https://pdfs.semanticscholar.org/4c38/8fbe53827627c21a9d2a650395ed4470e544.pdf>>, Mar. 17, 2007, 6 Pages.
Duong, et al., "Compiler-Assisted, Selective Out-of-Order Commit", In Journal of IEEE Computer Architecture Letters, vol. 12, Issue 1, Jan. 2013, 4 Pages.
Fallin, et al., "The Heterogeneous Block Architecture", In Proceedings of 32nd IEEE International Conference on Computer Design, Oct. 19, 2014, 8 Pages.
Gaudlot, et al., "The Sisal Model of Functional Programming and its Implementation", In Proceedings of Second Aizu International Symposium on Parallel Algorithms/Architectures Synthesis, Mar. 17, 1997, 12 Pages.
Gupta, Anshuman, "Design Decisions for Tiled Architecture Memory Systems", Retrieved from <<https://pdfs.semanticscholar.org/9100/c6bbb1f56997b8cad6c1661ee1ce1aa90ee5.pdf>>, Sep. 18, 2009, 14 Pages.
Hammond, et al., "Programming with Transactional Coherence and Consistency (TCC)", In ACM SIGOPS Operating Systems Review, vol. 38, Issue 5, Oct. 7, 2004, 13 Pages.
Hammond, et al., "Transactional Coherence and Consistency: Simplifying Parallel Hardware and Software", In IEEE Computer Society, vol. 24, Issue 6, Nov. 2004, pp. 92-103.
Hammond, et al., "Transactional Memory Coherence and Consistency", In IEEE Computer Society of SIGARCH Computer Architecture News, vol. 32, Issue 2, Jun. 19, 2004, 12 Pages.
Hao, et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Hayes, et al., "Unified On-chip Memory Allocation for SIMT Architecture", In Proceedings of the 28th ACM International Conference on Supercomputing, Jun. 10, 2014, pp. 293-302.
Hruska, Joel, "VISC CPU 'virtual core' design emerges: Could this be the conceptual computing breakthrough we've been waiting for?", Retrieved From <<https://www.extremetech.com/extreme/192858-visc-cpu-virtual-core-design-emerges-could-this-be-the-conceptual-breakthrough-weve-been-waiting-for>>, Oct. 24, 2014, 9 Pages.
Ipek, et al., "Core Fusion: Accommodating Software Diversity in Chip Multiprocessors", In Proceedings of the 34th Annual International Symposium on Computer Architecture, Jun. 9, 2007, 12 Pages.
Jhala, Ranjit, "Compiler Construction 22nd International Conference", In Proceedings of 22nd International Conference Conferences on Theory and Practice of Software, Mar. 16, 2013, 11 Pages.
Kamaraj, et al., "Design of Out-Of-Order Superscalar Processor with Speculative Thread Level Parallelism", In Proceedings of International Conference on Innovations in Engineering and Technology, Mar. 21, 2014, pp. 1473-1478.
Kane, Gerry, "PA-RISC 2.0 Architecture", In Publication of Prentice Hall PTR, Jan. 1, 1996, 28 Pages.
Kavi, et al., "Concurrency, Synchronization, Speculation—the Dataflow Way", In Journal of Advances in Computers, vol. 96, Nov. 23, 2013, 41 Pages.

(56) References Cited

OTHER PUBLICATIONS

Kinsy, et al., "Heracles: A Tool for Fast RTL-Based Design Space Exploration of Multicore Processors", In Proceedings of the ACM/SIGDA International Symposium on Field Programmable Gate Arrays, Feb. 11, 2013, pp. 125-134.
Kozumplik, et al., "TRIPS to the Semantic EDGE", Retrieved From <<https://web.archive.org/web/20150921054006/http://vbn.aaudk/ws/files/61072300/1212050422.pdf>>, Sep. 22, 2015, 28 Pages.
Li, et al., "Compiler-Assisted Hybrid Operand Communication", In Technical Report TR-09-33, The University of Texas at Austin, Nov. 1, 2009, 12 Pages.
Li, et al., "Hybrid Operand Communication for Dataflow Processors", In Workshop on Parallel Execution of Sequential Programs on Multi-core Architectures, Jun. 21, 2009, pp. 61-71.
Maher, et al., "Merging Head and Tail Duplication for Convergent Hyperblock Formation", In Proceedings of the 39th Annual IEEE/ACM International Symposium on Microarchitecture, Dec. 9, 2006, 12 Pages.
McDonald, et al., "Characterization of TCC on Chip-Multiprocessors", In 14th International Conference on Parallel Architectures and Compilation Techniques, Sep. 17, 2005, 12 Pages.
Munshi, et al., "A Parameterizable SIMD Stream Processor", In Proceedings of Canadian Conference on Electrical and Computer Engineering, May 1, 2005, pp. 806-811.
Muraoka, et al., "VCore-based Design Methodology", In Proceedings of the Asia and South Pacific Design Automation Conference, Jan. 21, 2003, pp. 441-445.
Nagarajan, et al., "A Design Space Evaluation of Grid Processor Architectures", In Proceedings of the 34th Annual ACM/IEEE International Symposium on Microarchitecture, Dec. 1, 2001, pp. 40-51.
Nagarajan, et al., "Critical Path Analysis of the TRIPS Architecture", In IEEE International Symposium on Performance Analysis of Systems and Software, Mar. 19, 2006, 11 Pages.
Park, et al., "Reducing Design Complexity of the Load/Store Queue", In Proceedings of the 36th annual IEEE/ACM International Symposium on Microarchitecture, Dec. 3, 2003, 12 Pages.
"International Search Report and Written Opinion Issued in PCT Application No. PCT/US2016/038842", dated Oct. 6, 2016, 11 Pages.
"International Search Report and Written Opinion Issued in PCT Application No. PCT/US2016/038843", dated Oct. 10, 2016, 11 Pages.
"International Search Report and Written Opinion Issued in PCT Application No. PCT/US2016/038845", dated Sep. 30, 2016, 14 Pages.
"International Search Report and Written Opinion Issued in PCT Application No. PCT/US2016/038846", dated Oct. 6, 2016, 11 Pages.
"International Search Report and Written Opinion Issued in PCT Application No. PCT/US2016/038847", dated Nov. 9, 2016, 10 Pages.
"International Search Report and Written Opinion Issued in PCT Application No. PCT/US2016/038848", dated Oct. 5, 2016, 11 Pages.
"International Search Report and Written Opinion Issued in PCT Application No. PCT/US2016/038853", dated Sep. 22, 2016, 15 Pages.
"Second Written Opinion Issued in PCT Application No. PCT/US2016/038853", dated May 24, 2017, 6 Pages.
"International Search Report and Written Opinion Issued in PCT Application No. PCT/US2016/038854", dated Sep. 22, 2016, 13 Pages.
"International Search Report and Written Opinion Issued in PCT Application No. PCT/US2016/038855", dated Sep. 27, 2016, 13 Pages.
"Second Written Opinion Issued in PCT Application No. PCT/US2016/038855", dated May 18, 2017, 8 Pages.
"International Search Report and Written Opinion Issued in PCT Application No. PCT/US2016/051209", dated Dec. 16, 2016, 10 Pages.
"International Search Report and Written Opinion Issued in PCT Application No. PCT/US2016/051413", dated Jan. 2, 2017, 16 Pages.
"International Search Report and Written Opinion Issued in PCT Application No. PCT/US2016/051417", dated Dec. 15, 2016, 10 Pages.
Pericas, et al., "A Two-Level Load/Store Queue Based on Execution Locality", In Proceedings of 35th International Symposium on Computer Architecture, Jun. 21, 2008, 12 Pages.
Pierce, et al., "Wrong-Path Instruction Prefetching", In Proceedings of the 29th Annual IEEE/ACM International Symposium on Microarchitecture, Dec. 2, 1996, 17 Pages.
Pricopi, et al., "Bahurupi: A Polymorphic Heterogeneous Multi-Core Architecture.", In the ACM Transactions on Architecture and Code Optimization, vol. 8, Issue 4, Jan. 1, 2012, pp. 1-22.
Rahman, Rezaur, "Intel® Xeon Phi™Core Micro-Architecture", Retrieved from >>https://software.intel.com/en-us/articles/intel-xeon-phi-core-micro-architecture>>, May 31, 2013, 28 Pages.
Robatmili, et al., "Exploiting Criticality to Reduce Bottlenecks in Distributed Uniprocessors", In Proceedings of 17th IEEE International Symposium on High-Performance Computer Architecture, Feb. 2011, 12 Pages.
Roesner, Franziska, "Counting Dependence Predictors", In Undergraduate Honors Thesis, May 2, 2008, 25 Pages.
Sarkar, et al., "Understanding Power Multiprocessors", In Proceedings of the 32nd ACM SIGPLAN Conference on Programming Language Design and Implementation, Jun. 4, 2011, pp. 175-186.
Sethumadhavan, et al., "Design and Implementation of the TRIPS Primary Memory System", In Proceedings of International Conference on Computer Design, ICCD, Oct. 1, 2006, 7 Pages.
Sethumadhavan, et al., "Late-Binding: Enabling Unordered Load-Store Queues", In Proceedings of the 34th Annual International Symposium on Computer Architecture, Jun. 9, 2007, pp. 347-357.
Smith, et al., "Dataflow Predication", In Proceedings of the 39th Annual IEEE/ACM International Symposium on Microarchitecture, Dec. 9, 2006, 12 Pages.
Sohi, et al., "Multiscalar Processors", In Proceedings of 22nd Annual International Symposium on Computer Architecture, Jun. 22, 1995, 12 Pages.
Sohi, Gurindar, "Retrospective: Multiscalar Processors", In Proceedings of the 25th Annual International Symposium on Computer Architectures, Jun. 27, 1998, pp. 1111-1114.
Souza, et al., "Dynamically Scheduling VLIW Instructions", In Journal of Parallel and Distributed Computing, vol. 60, Jul. 2000, pp. 1480-1511.
Valentine, Bob, "Introducing Sandy Bridge", Retrieved from <<https://cesga.es/en/paginas/descargaDocumento/d/135>>, Retrieved Date: Aug. 24, 2015, 54 Pages.
Wong, et al., "Efficient Methods for Out-of-Order Load/Store Execution for High- Performance soft Processors", In Proceedings of International Conference on Field-Programmable Technology, Dec. 9, 2013, pp. 442-445.
Wu, et al., "Block Based Fetch Engine for Superscalar Processors", In Proceedingsof the 15th International conference on Computer Applications in Industry and Engineering, Nov. 7, 2002, 4 Pages.
Zmily, et al., "Block-Aware Instruction Set Architecture", In Proceedings of ACM Transactions on Architecture and Code Optimization, vol. 3, Issue 3, Sep. 2006, pp. 327-357.

* cited by examiner

AGE-BASED MANAGEMENT OF INSTRUCTION BLOCKS IN A PROCESSOR INSTRUCTION WINDOW

BACKGROUND

Designers of instruction set architectures (ISAs) and processors make power and performance trade-offs. For example, if a designer chooses an ISA with instructions that deliver higher performance, then the power consumption by the processor may be higher as well. Alternatively, if the designer chooses an ISA with instructions that consume lower power, then the performance may be lower. The power consumption may be tied to the amount of hardware resources of the processor, such as arithmetic logic units (ALUs), cache lines, or registers, used by the instructions during execution. Use of a large amount of such hardware resources may deliver higher performance at the cost of higher power consumption. Alternatively, the use of a small amount of such hardware resources may result in lower power consumption at the cost of lower performance. Compilers may be used to compile high-level code into instructions compatible with the ISA and the processor architecture.

SUMMARY

A processor core in an instruction block-based microarchitecture includes a control unit that explicitly tracks instruction block state including age or priority for current blocks that have been fetched from an instruction cache. Tracked instruction blocks are maintained in an age-ordered or priority-ordered list. When an instruction block is identified by the control unit for commitment, the list is checked for a match and a matching instruction block can be refreshed without re-fetching from the instruction cache. If a match is not found, an instruction block can be committed and replaced based on either age or priority. Such instruction state tracking typically consumes little overhead and enables instruction blocks to be reused to increase processor core efficiency. And rather than handle instruction blocks strictly based on their dynamic age, as with a conventional reorder or circular buffers, the control unit implements control flow independence to enable instruction blocks to be handled out of order so that mispredicted instruction blocks can be skipped which would otherwise waste processing cycles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
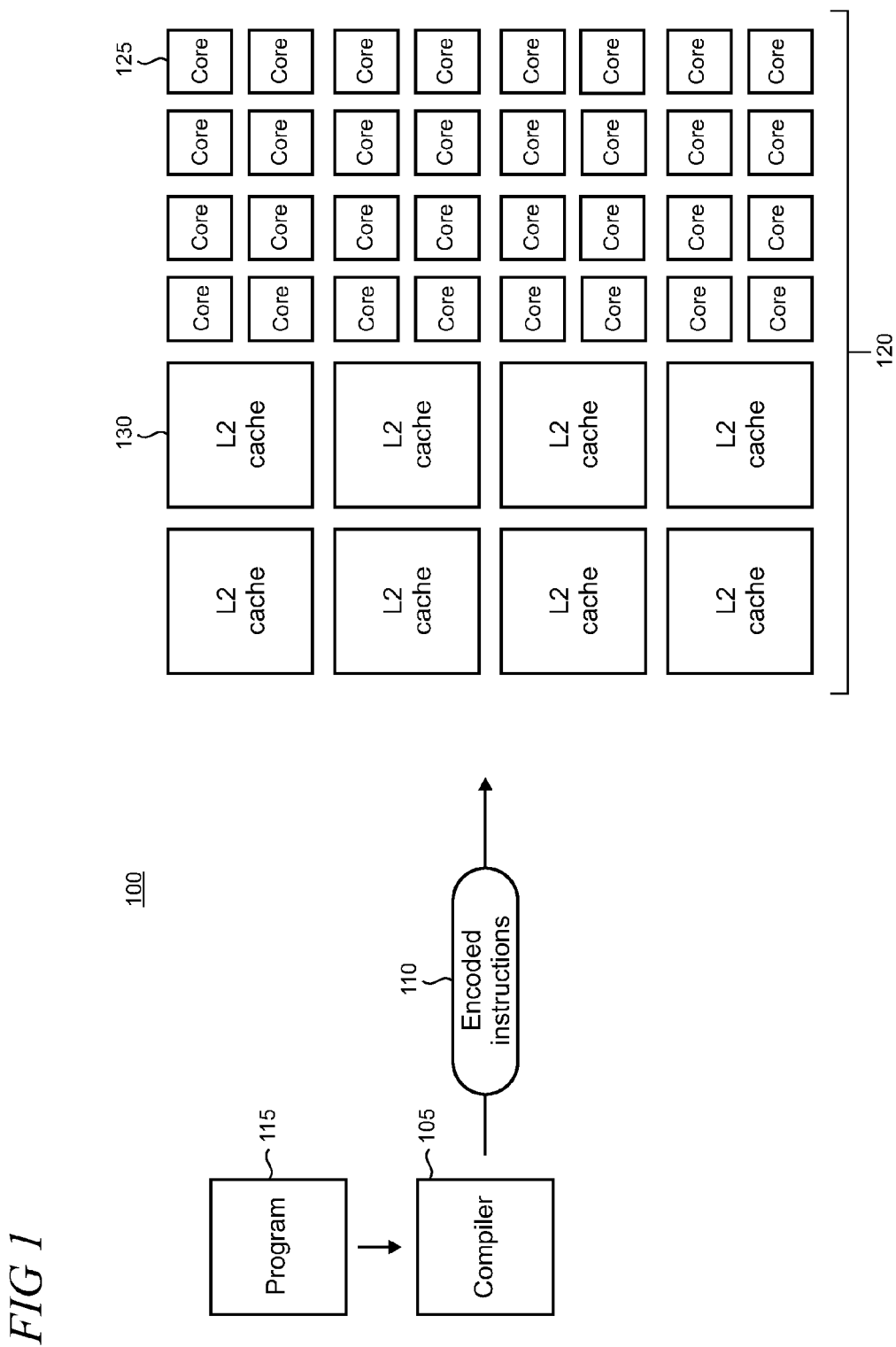
FIG. 1 shows an illustrative computing environment in which a compiler provides encoded instructions that run on an architecture that includes multiple processor cores.

FIG. 1 shows an illustrative computing environment 100 with which the present age-based management of instruction blocks may be utilized. The environment includes a compiler 105 that may be utilized to generate encoded machine-executable instructions 110 from a program 115. The instructions 110 can be handled by a processor architecture 120 that is configured to process blocks of instructions of variable size containing, for example, between 4 and 128 instructions.

The processor architecture 120 typically includes multiple processor cores (representatively indicated by reference numeral 125) in a tiled configuration that are interconnected by an on-chip network (not shown) and further interoperated with one or more level 2 (L2) caches (representatively indicated by reference numeral 130). While the number and configuration of cores and caches can vary by implementation, it is noted that the physical cores can be merged together, in a process termed "composing" during runtime of the program 115, into one or more larger logical processors that can enable more processing power to be devoted to a program execution. Alternatively, when program execution supports suitable thread-level parallelism, the cores 125 can be split, in a process called "decomposing," to work independently and execute instructions from independent threads.

Figure 2:
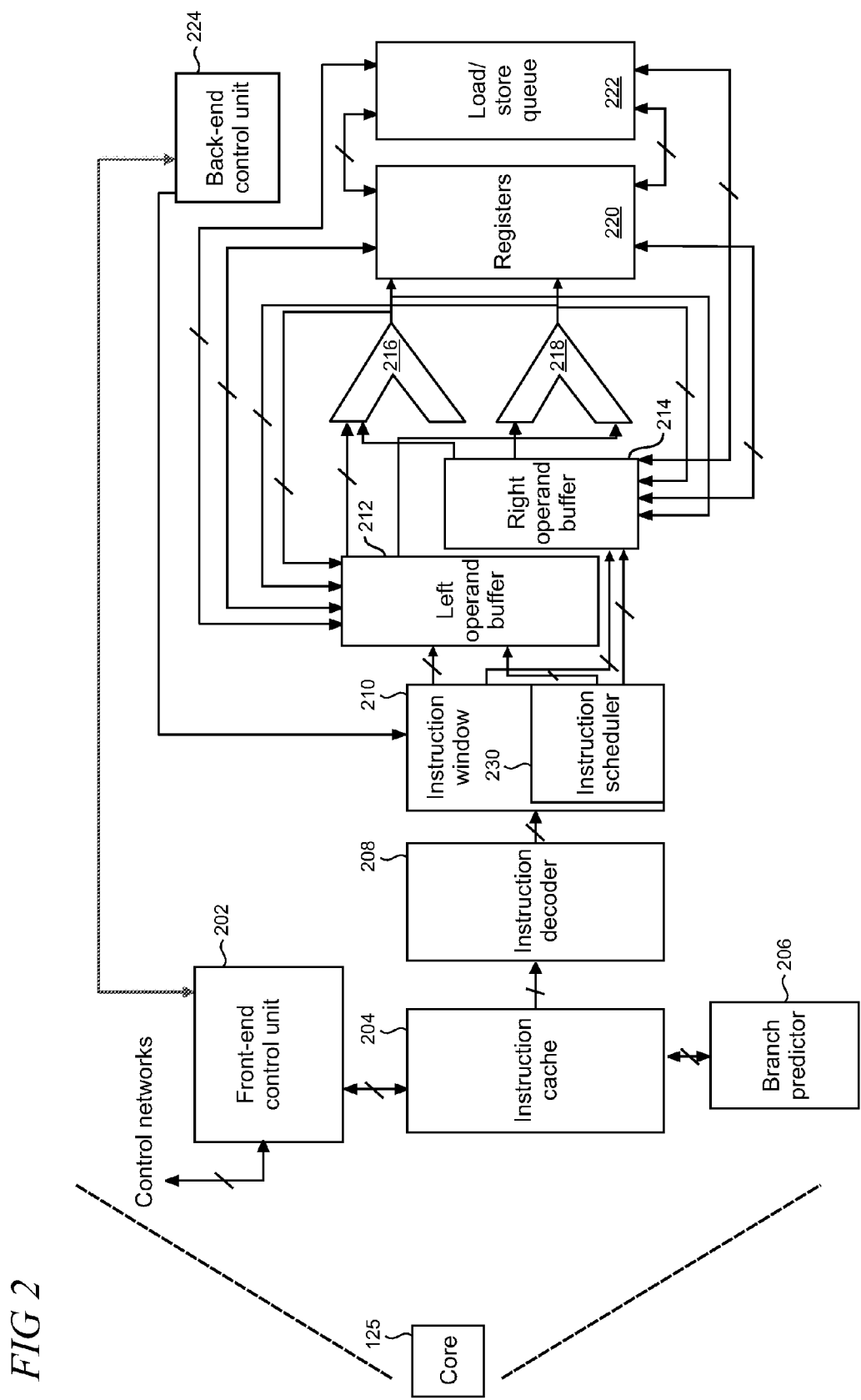
FIG. 2 is a block diagram of an illustrative microarchitecture for an exemplary processor core.

FIG. 2 is a simplified block diagram of a portion of an illustrative processor core 125. As shown, the processor core 125 may include a front-end control unit 202, an instruction cache 204, a branch predictor 206, an instruction decoder 208, an instruction window 210, a left operand buffer 212, a right operand buffer 214, an arithmetic logic unit (ALU) 216, another ALU 218, registers 220, and a load/store queue 222. In some cases, the buses (indicated by the arrows) may carry data and instructions while in other cases, the buses may carry data (e.g., operands) or control signals. For example, the front-end control unit 202 may communicate, via a bus that carries only control signals, with other control networks. Although FIG. 2 shows a certain number of illustrative components for the processor core 125 that are arranged in a particular arrangement, there may be more or fewer components arranged differently depending on the needs of a particular implementation.

The front-end control unit 202 may include circuitry configured to control the flow of information through the processor core and circuitry to coordinate activities within it. The front-end control unit 202 also may include circuitry to implement a finite state machine (FSM) in which states enumerate each of the operating configurations that the processor core may take. Using opcodes (as described below) and/or other inputs (e.g., hardware-level signals), the FSM circuits in the front-end control unit 202 can determine the next state and control outputs.

Accordingly, the front-end control unit 202 can fetch instructions from the instruction cache 204 for processing by the instruction decoder 208. The front-end control unit 202 may exchange control information with other portions of the processor core 125 over control networks or buses. For example, the front-end control unit may exchange control information with a back-end control unit 224. The front-end and back-end control units may be integrated into a single control unit in some implementations.

The front-end control unit 202 may also coordinate and manage control of various cores and other parts of the processor architecture 120 (FIG. 1). Accordingly, for example, blocks of instructions may be simultaneously executing on multiple cores and the front-end control unit 202 may exchange control information via control networks with other cores to ensure synchronization, as needed, for execution of the various blocks of instructions.

The front-end control unit 202 may further process control information and meta-information regarding blocks of instructions that are executed atomically. For example, the front-end control unit 202 can process block headers that are associated with blocks of instructions. As discussed below in more detail, the block header may include control information and/or meta-information regarding the block of instructions. Accordingly, the front-end control unit 202 can include combinational logic, state machines, and temporary storage units, such as flip-flops to process the various fields in the block header.

The front-end control unit 202 may fetch and decode a single instruction or multiple instructions per clock cycle. The decoded instructions may be stored in an instruction window 210 that is implemented in processor core hardware as a buffer. The instruction window 210 can support an instruction scheduler 230, in some implementations, which may keep a ready state of each decoded instruction's inputs such as predications and operands. For example, when all of its inputs (if any) are ready, a given instruction may be woken up by instruction scheduler 230 and be ready to issue.

Before an instruction is issued, any operands required by the instruction may be stored in the left operand buffer 212 and/or the right operand buffer 214, as needed. Depending on the opcode of the instruction, operations may be performed on the operands using ALU 216 and/or ALU 218 or other functional units. The outputs of an ALU may be stored in an operand buffer or stored in one or more registers 220. Store operations that issue in a data flow order may be queued in load/store queue 222 until a block of instruction commits. When the block of instruction commits, the load/store queue 222 may write the committed block's stores to a memory. The branch predictor 206 may process block header information relating to branch exit types and factor that information in making branch predictions.

As noted above, the processor architecture 120 typically utilizes instructions organized in blocks that are fetched, executed, and committed atomically. Thus, a processor core may fetch the instructions belonging to a single block en masse, map them to the execution resources inside the processor core, execute the instructions, and commit their results in an atomic fashion. The processor may either commit the results of all instructions or nullify the execution of the entire block. Instructions inside a block may execute in a data flow order. In addition, the processor may permit the instructions inside a block to communicate directly with each other using messages or other suitable forms of communications. Thus an instruction that produces a result may, instead of writing the result to a register file, communicate that result to another instruction in the block that consumes the result. As an example, an instruction that adds the values stored in registers R1 and R2 may be expressed as shown in Table 1 below:

TABLE 1

I[0] READ R1 T[2R];
I[1]READ R2 T[2L];
I[2] ADD T[3L].

In this way, source operands are not specified with the instruction and instead, they are specified by the instructions that target the ADD instruction. The compiler 105 (FIG. 1) may explicitly encode the control and data dependencies during compilation of the instructions 110 to thereby free the processor core from rediscovering these dependencies at runtime. This may advantageously result in reduced processor load and energy savings during execution of these instructions. As an example, the compiler may use predication to convert all control dependencies into data flow instructions. Using these techniques, the number of accesses to power-hungry register files may be reduced. Table 2, below, shows an example of a general instruction format for such instructions:

TABLE 2

| OPCODE | PR | BID | XOP | TARGET1 | TARGET2 |
|--------|----|----|----|---------|---------|

Each instruction may be of a suitable size, such as 32 bits, 64 bits, or another size. In the example shown in Table 2, each instruction may include an OPCODE field, a PR (predication) field, a BID (broadcast ID) field, an XOP (extended OPCODE) field, a TARGET1 field, and a TARGET2 field. The OPCODE field may specify a unique operation code for an instruction or a block of instructions, such as add, read, write, or multiply. The PR (predication) field may specify any predication associated with the instruction. For example, a two bit PR field may be used as follows: 00—not predicated, 01—reserved, 10—predicated on false, and 11—predicated on true. Thus, for example, if an instruction executes only if the result of a comparison is true, then that instruction may be predicated on the result of another instruction that performs the comparison. The BID (broadcast ID) field may support sending of an operand to any number of consumer instructions in a block. A 2-bit BID field may be used to encode the broadcast channel on which the instruction receives one of its operands. The XOP (extended OPCODE) field may support extending the types of opcodes. The TARGET1 and TARGET2 fields may allow up to two target instructions to be encoded. The target field may specify a consumer instruction of the result of the producer instruction, thus permitting direct communication between instructions.

Each block of instructions may have certain information associated with the block of instructions, such as control information and/or meta-information related to the block. This information may be generated by the compiler 105 during compilation of the program into the instructions 110 for execution on the processor architecture 120. Some of this information may be extracted by the compiler during compilation of a block of instructions and then examining the nature of the instructions during runtime.

In addition, the information associated with a block of instructions may be meta-information. For example, such information may be provided to a processor core using special instructions or instructions that provide target encoding related to registers or other memory that may have the relevant information associated with a block of instructions. In case of special instructions, the opcode field of such instructions can be used to communicate information relating to the block of instructions. In another example, such information may be maintained as part of the processor status word (PSW). For example, this information may advantageously help the processor execute the block of instructions more efficiently.

Figure 3:
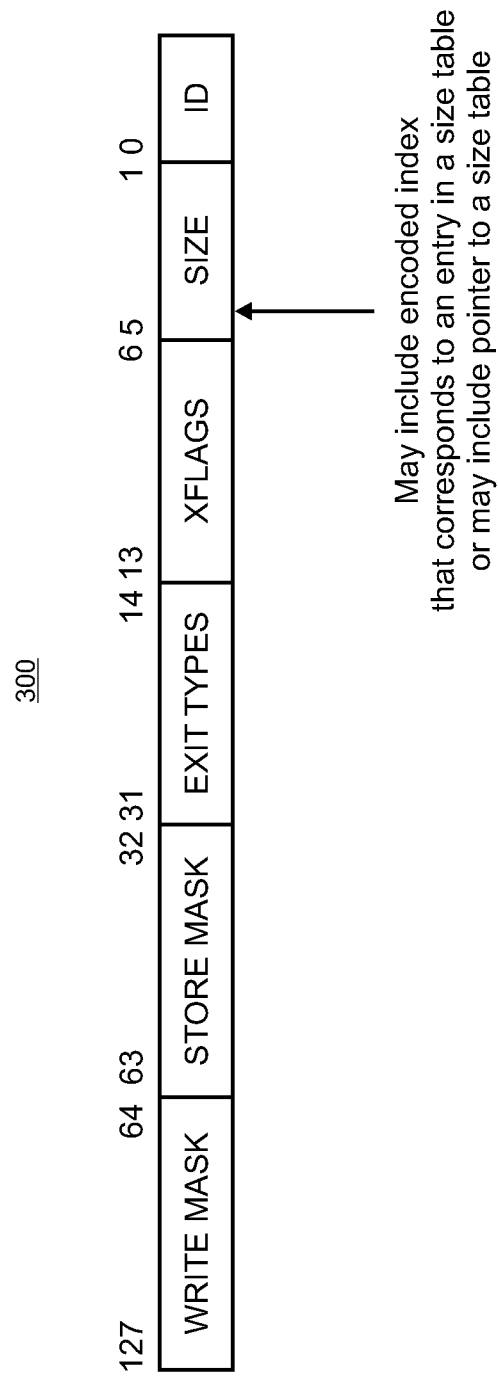
FIG. 3 shows an illustrative arrangement for a block header.

Various types of information can be provided to a processor core using a block header, special instructions, memory referenced locations, a processor status word (PSW), or various combinations thereof. An illustrative instruction block header 300 is shown in FIG. 3. In this illustrative example, the block header 300 is 128 bits and begins at offset 0 from a block's program counter. The respective beginning and ending of each field is also shown. The fields are described in Table 3 below:

TABLE 3

| Field | Description |
|---|---|
| ID | This field may be set to 1 to indicate the beginning of a valid instruction block. It may also include information regarding machine version and architecture version. In addition, this field may be used to indicate to the processor whether the block header has any ready bits or valid bits, such as, as part of the READY STATE field. |
| SIZE | This field may contain the number of 4 instruction chunks contained in an instruction block. Thus, for example, a value of 0 may indicate the smallest block of instructions in the block, e.g., a block header followed by 4 instructions. Alternatively or optionally, the SIZE field may include an encoded value that corresponds to an entry in a size table, or the field may include a pointer to a size table. |
| XFLAGS | This field may include execution flags that indicate special execution requirements:<br>XFLAGS[0] Vector Mode<br>  This flag may indicate that the instructions will be copied into independent vector lanes, each of which may include an instruction window, operand buffers, an ALU, and registers.<br>XFLAGS[1] Inhibit Branch Predictor<br>  This flag, when set, may result in the branch predictor being inhibited. This may prevent the branch predictor from predicting which way a branch (e.g., a predicated instruction) will go before this is known for sure.<br>XFLAGS[2] Inhibit Memory Dependence Predictor<br>  This flag, when set, may result in memory dependence being inhibited. This may prevent the memory dependence predictor from predicting dependencies between memory operations, such as load/store operations.<br>XFLAGS[3] Block Synchronization Required<br>  This flag, when set, may impose a requirement that another block of instructions may not be executed on another processor core in parallel with the current block of instructions. In addition this flag, when set, may also impose a requirement that the block of instructions may not execute speculatively.<br>XFLAGS[4] Break After Block<br>  This flag, when set, may indicate that there is a break after the block of instructions.<br>XFLAGS[5] Break Before Block<br>  This flag, when set, may indicate that there is break before the block of instructions.<br>XFLAGS[6] Reserved<br>  This flag may be reserved for future use.<br>XFLAGS[7] Reserved<br>  This flag may be reserved for future use. |
| EXIT TYPES | This field may encode up to six 3-bit block exit types for use by the branch predictor.<br>000 - Null: may indicate to the branch predictor that there is no information for the branch predictor in this field.<br>001 - Sequential: may indicate to the branch predictor that the next branch is to the next block of instructions in the code. The sequential branch exit type may be computed by factoring in the current address of the block of instructions and the size of the block of instructions, e.g., a current block address and the size of the block.<br>010 - Offset: may indicate to the branch predictor that the next branch is to an offset address, where the offset is treated as a block offset.<br>011 - Indirect: may indicate to the branch predictor that the next branch is an indirect type. Thus, for example, it may rely on a register of a memory location that contains the address of the first instruction of the successor block of instructions.<br>100 - Call: may indicate to the branch predictor that if the successor block of instructions contains a subroutine call, then the predicted branch goes to that successor block of instructions.<br>101 - Return: may indicate to the branch predictor that if the successor block of instructions contains a return from a subroutine call, then the predicted branch goes to that successor block of instructions.<br>Other bit patterns may be reserved for future uses. |

TABLE 3-continued

| Field | Description |
|---|---|
| STORE MASK | This field may identify the load-store identifiers (LSIDs) that are assigned to stores. For example, the LSQ block may have to receive each of the LSIDs assigned to stores for a block of instructions before the block of instructions is allowed to complete. |
| WRITE MASK | This field may identify the global registers that the block of instructions may write. For example, the register file may have to receive each entry of writes before the block of instructions is allowed to complete. |

While the block header shown in FIG. 3 and described in Table 3 includes multiple fields, it is intended to be illustrative and other field arrangements may be utilized for a particular implementation.

In an illustrative example, the compiler 105 (FIG. 1) may select information for inclusion in a block header or for special instructions that can provide such information to a processor core based on the nature of the instructions and/or based on the nature of the processing requirements, such as high-performance or low-power. This may advantageously allow more optimal balancing of trade-offs between performance and power consumption. For certain types of processing applications, such as high performance computing with a large number of cores, a large amount of information may be a desirable option. Alternatively, for other types of processing applications, such as embedded processors used in the Internet of Things, mobile devices, wearable devices, head mounted display (HMD) devices, or other embedded computing type of applications, less information may be a desirable option.

The extent of the information communicated using a block header or special instructions can be tailored depending upon the nature of the instructions in a block. For example, if the block of instructions includes a loop that is executed in a recurring manner, then more extensive information might be needed to encapsulate the control information associated with that block. The additional control information may allow a processor core to execute the loop more efficiently to thereby improve performance.

Alternatively, if there is a block of instructions that will be rarely executed, then relatively less information may suffice. For example, if the block of instructions includes several predicated control loops, then more information may be needed. Similarly, if the block of instructions has an extensive amount of instruction level parallelism, then more information may be needed as part of a block header or special instructions.

The additional control information in the block header or special instructions may be used, for example, to effectively exploit the instruction level parallelism in the block of instructions. If the block of instructions includes several branch predictions, then more information may be needed. The additional control information regarding branch predictions will typically enhance code execution with more efficiency as it can result in fewer pipeline flushes.

It is noted that the functionality corresponding to the fields in the block header may be combined or further separated. Similarly, a special instruction may provide information related to any one of the fields shown in FIG. 3 and Table 3 or it may combine the information from such fields. For example, while the illustrative block header of FIG. 3 and Table 3 includes a separate ID field and a SIZE field, these two fields may be combined into a single field.

Likewise, a single special instruction may, when decoded, provide information regarding the size of the block of instructions and the information in the ID field. Unless indicated otherwise, the special instructions may be included anywhere in the block of instructions. For example, a BLOCK_SIZE #size instruction may contain an immediate field including a value of the size of a block of instructions. The immediate field may contain an integer value that provides the size information. Alternatively, the immediate field may include an encoded value relating to the size information so that the size information may be obtained by decoding the encoded value, for example, by looking up the value in a size table that may be expressed using one of logic, register, memory, or code stream. In another example, a BLOCK_ID #id special instruction may convey the block ID number.

A separate mathematical function or a memory-based table may map a block ID into the memory address of a block header. The block ID conveyed as part of such instruction may be unique to each block of instructions. In another example, a BLOCK_HDR_ID #id instruction may convey the block header ID number. A separate mathematical function or a memory-based table may map the block ID into the memory address of a block header. The block ID conveyed as part of such instruction may be shared by several blocks of instructions with the same header structure or fields.

In another example, a BLOCK_INFO #size, #exit types, #store mask, #write mask instruction may provide information regarding the enumerated fields of the instruction. These fields may correspond to any one of the fields discussed above with respect to Table 3. Other changes may be made to the block header structure and format and special instructions according to requirements of a given implementation. For example, additional fields may be provided that include information relating to the characteristics of a block of instructions. Particular fields can be included based on the frequency of the execution of the block of instructions.

The fields included in the block header structure, or information provided via special instructions or other mechanisms discussed earlier, may be part of a publicly available standard Instruction Set Architecture (ISA) of a particular processor or a family of processors. A subset of the fields may be a proprietary extension to the ISA. Certain bit values in the field may be part of the standard ISA for the processor, but certain other bit values in the field may provide proprietary functionality. This exemplary field may allow an ISA designer to add proprietary extensions to the ISA without disclosing entirely the nature and the functionality associated with the proprietary extension. Thus, in this instance, the compiler tools distributed by the ISA designer would support the proprietary bit values in the field, an entirely separate proprietary field, or a special instruction. The use of such a field may be particularly relevant to hardware accelerators that are proprietary to certain processor designs. Thus, a program may include a block header field or a special instruction that is unrecognizable; but the program may further include a recipe to decipher the field or decode the instruction.

The compiler 105 (FIG. 1) may process a block of instructions, which are typically configured to execute atomically by one more processor cores, in order to generate information about the block of instructions, including meta-information and control information. Some programs may be compiled for only one ISA, for example, an ISA used with processors for the Internet of Things, mobile devices, HMD devices, wearable devices, or other embedded computing environments. The compiler may employ techniques, such as static code analysis or code profiling to generate information that is relevant to the block of instructions. In some cases, the compiler may consider factors such as the characteristics of the block of instructions and its frequency of execution. The relevant characteristics of the block of instructions may include, for example, but are not necessarily limited to (1) the instruction level parallelism, (2) the number of loops, (3) the number of predicated control instructions, and (4) the number of branch predictions.

Figure 4:
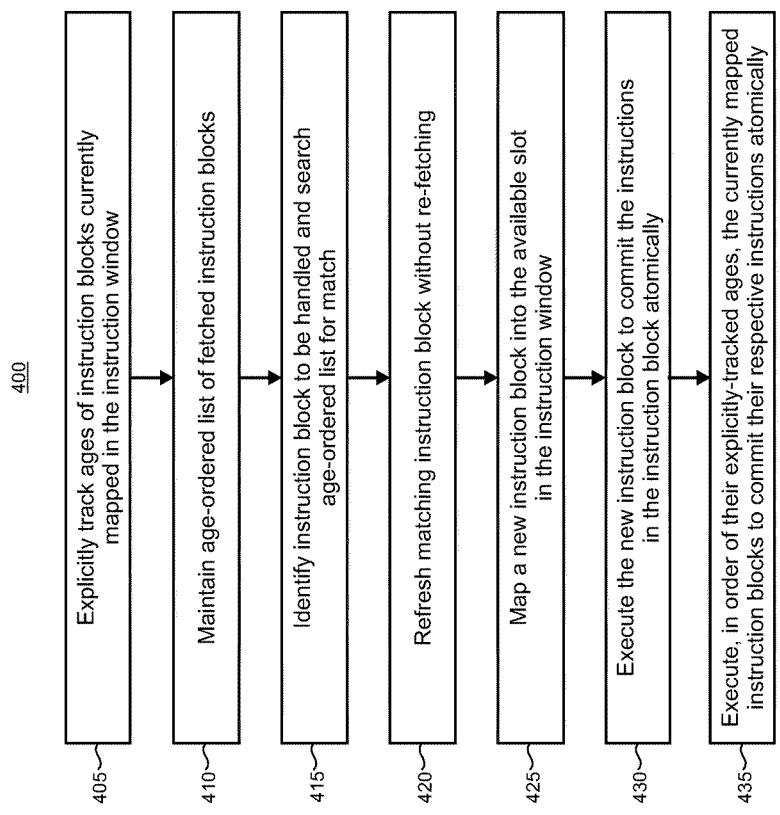
FIGS. 4-15 are flowcharts of illustrative methods.

FIG. 4 is a flowchart of an illustrative method 400 for managing instruction blocks in an instruction window disposed in a processor core. Unless specifically stated, the methods or steps in the flowchart of FIG. 4 and those in the other flowcharts shown in the drawings and described below are not constrained to a particular order or sequence. In addition, some of the methods or steps thereof can occur or be performed concurrently and not all the methods or steps have to be performed in a given implementation depending on the requirements of such implementation and some methods or steps may be optionally utilized. Likewise, some steps may be eliminated in some implementations to reduce overhead but this may result in increased brittleness, for example. The various feature, cost, overhead, performance, and robustness tradeoffs which may be implemented in any given application may be typically viewed as a matter of design choice.

In step 405, the ages of fetched instruction blocks are explicitly tracked using, for example, an age vector. Thus, rather than use instruction block order (i.e., position) in the instruction window, which is typically used to implicitly track age, the control unit maintains explicit state. An age-ordered list of instruction blocks is maintained in step 410. Instruction block priority (where priority may be determined by the compiler in some cases) may also be tracked and a priority-ordered list of instruction blocks may also be maintained in some implementations.

In step 415, when an instruction block is identified for handling, the age-ordered list is searched to find a matching instruction block. The priority-ordered list may also be searched in some implementations for a match. If a matching instruction block is found, then it can be refreshed, in step 420, without having to re-fetch it from the instruction cache which can improve processor core efficiency. Such refreshing enables reuse of the instruction block in situations, for example, when a program executes in a tight loop and instructions branch back on themselves. Such efficiency increases may also be compounded when multiple processor cores are composed into a large scale array. When refreshing an instruction block, the instructions are left in place and only the valid bits in the operand buffer and load/store queue are cleared.

If a match to the instruction block is not found, then the age-ordered list (or the priority-ordered list) can be utilized again to find an instruction block that can be committed to open a slot in the instruction window for the new instruction block. For example, the oldest instruction block or the lowest priority instruction block may be committed (where a high priority block may be desired to keep buffered since there is likelihood of its future reuse). In step 425, the new instruction block is mapped into the available slot. The instruction block can be allocated using a bulk allocation process in which instructions in the block and all the resources associated with the instructions are fetched at once (i.e., en masse).

In step 430, the new instruction block is executed so that its instructions are committed atomically. Other instruction blocks may be executed in order of age, in a similar manner to a conventional reorder buffer, in step 435 to commit their respective instructions in an atomic manner.

Figure 5:
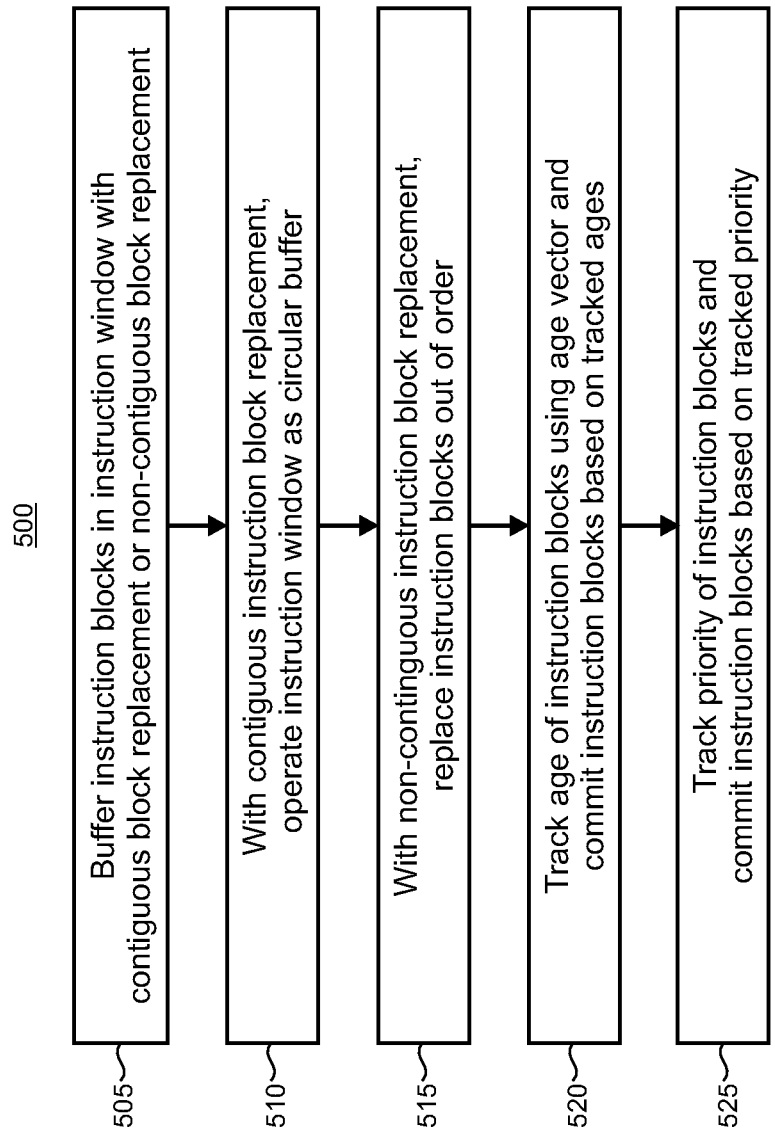

FIG. 5 is a flowchart of an illustrative method 500 that may be performed by an instruction block-based microarchitecture. In step 505, a control unit in a processor core causes fetched instruction blocks to be buffered with either contiguous replacement or non-contiguous replacement. In step 510, with contiguous instruction block replacement, the buffer can be operated like a circular buffer. In step 515, with non-contiguous instruction block replacement, instruction blocks may be replaced out of order. For example, in step 520 explicit age-based tracking can be performed so that instruction blocks are committed and replaced based on the tracked ages, in a similar manner as described above. Priority can also be tracked and the tracked priority may be used to commit and replace instruction blocks in step 525.

Figure 6:
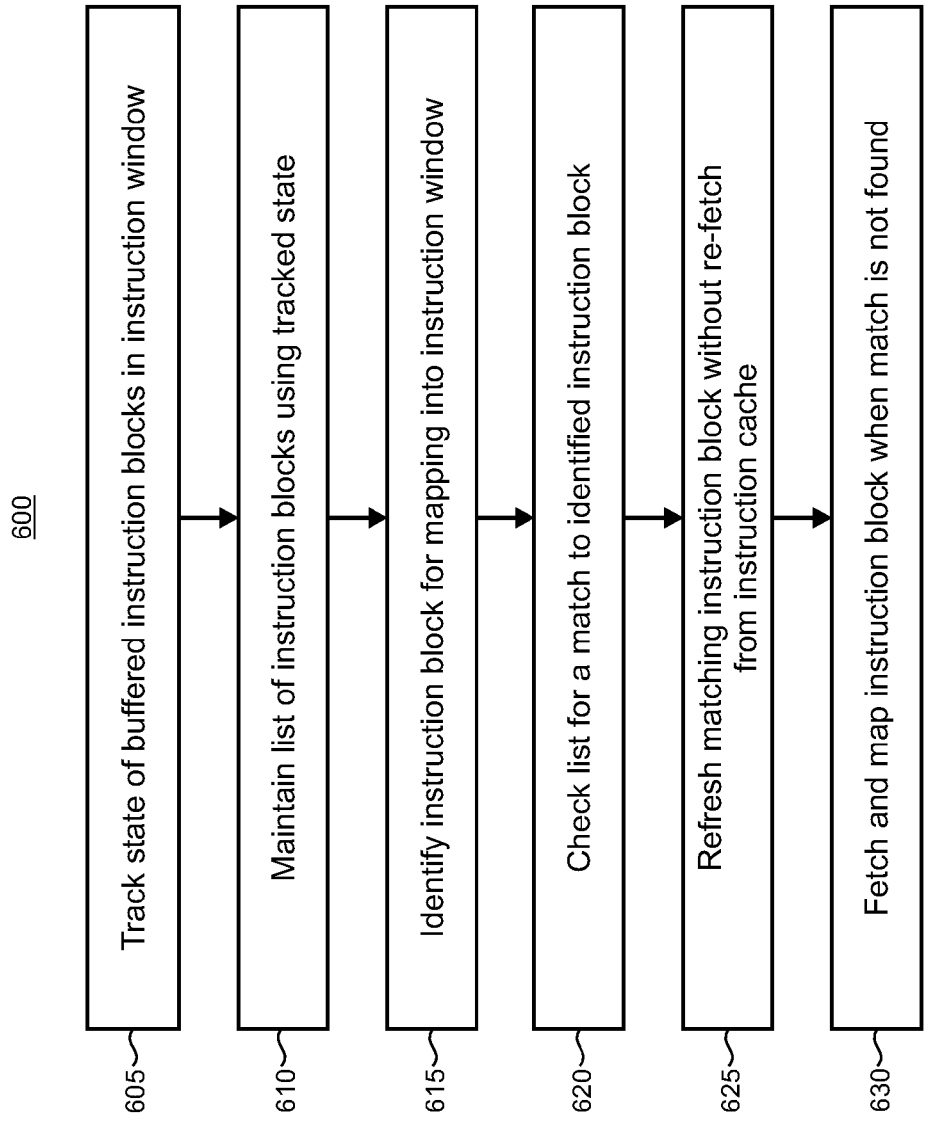

FIG. 6 is a flowchart of an illustrative method 600 that may be performed by a control unit disposed in a processor core. In step 605, the state of buffered instruction blocks is tracked and a list of instruction blocks is maintained using the tracked state in step 610. For example, state can include age, priority, or other information or context depending on particular implementation requirements. In step 615, when an instruction block is identified for mapping, the list is checked for a match, as shown in step 620. A matching instruction block from the list is refreshed without re-fetching in step 625. When a matching instruction block is not found in the list, then the instruction block is fetched from the instruction cache and mapped into an available slot in the instruction window in step 630 in a similar manner as described above.

Figure 7:
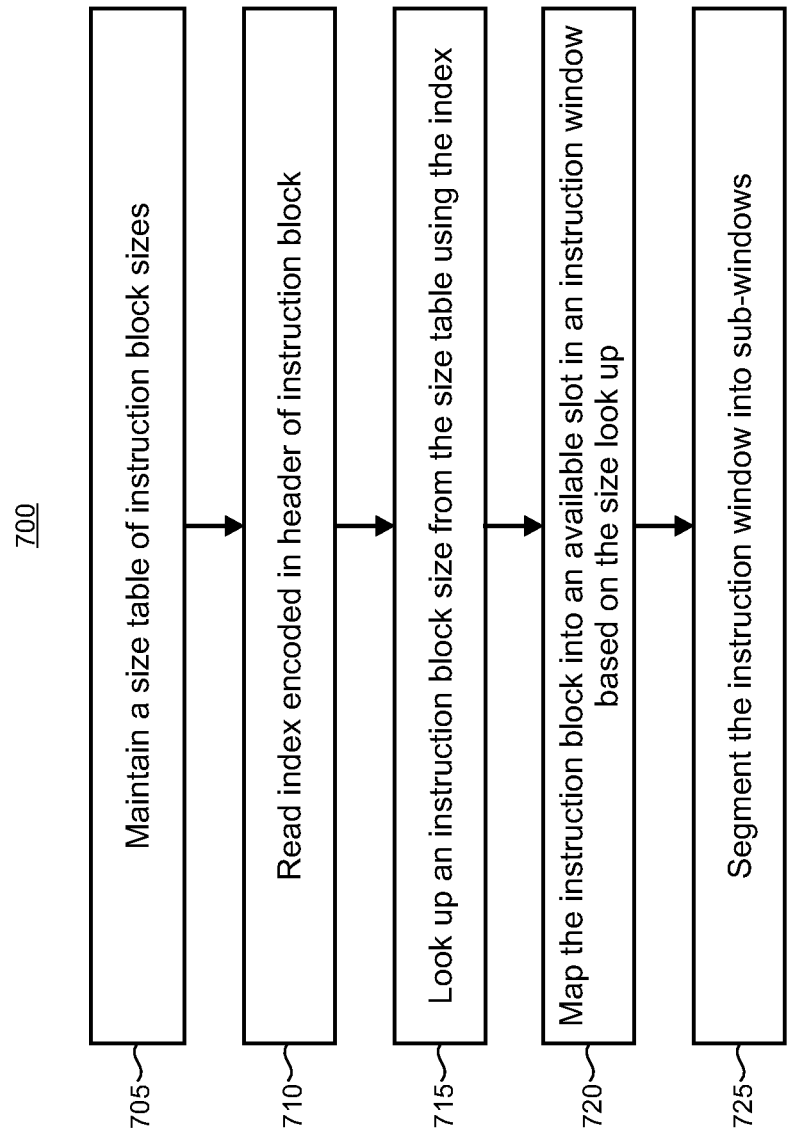

FIG. 7 is a flowchart of an illustrative method 700 for managing instructions blocks in an instruction window disposed in a processor core. In step 705, a size table of instruction block sizes is maintained in the processor core. The size table can be expressed in various ways, for example, using one of logic, register, memory, code stream, or other suitable construct. In step 710, an index that is encoded in a header of an instruction block is read. The instruction block includes one or more decoded instructions. Accordingly, rather than using the SIZE field shown in FIG. 3 and Table 3 to hard code an instruction block size, the field may be used to encode or store an index to the size table. That is, the index may function as a pointer to an entry in the size window to enable a particular size to be associated with the instruction block.

The number of size entries that are included in the size table can vary by implementation. A greater number of size entries may be utilized to enable more granularity which may be beneficial in cases where there is a relatively wide distribution of instruction block sizes associated with a given program, but at a cost of increased overhead in typical implementations. In some cases, the number of sizes included in the table can be selected by the compiler to cover a particular distribution of instruction block sizes in a way that optimizes overall instruction packing density and to minimize no ops. For example, the sizes included in the size table can be selected to match commonly used block instruction sizes in the program. In step 715, the index is used to look up an instruction block size from the size table. The instruction block is mapped into an available slot in the instruction window based on its size in step 720.

In some implementations, as shown in step 725, the instruction window may be segmented into two or more sub-windows, for example, that use two or more different sizes. Such variation in the segmented sub-windows may enable further accommodation for a given distribution of instruction block sizes and may further increase instruction packing density. The segmentation may also be dynamically performed in some scenarios.

Figure 8:
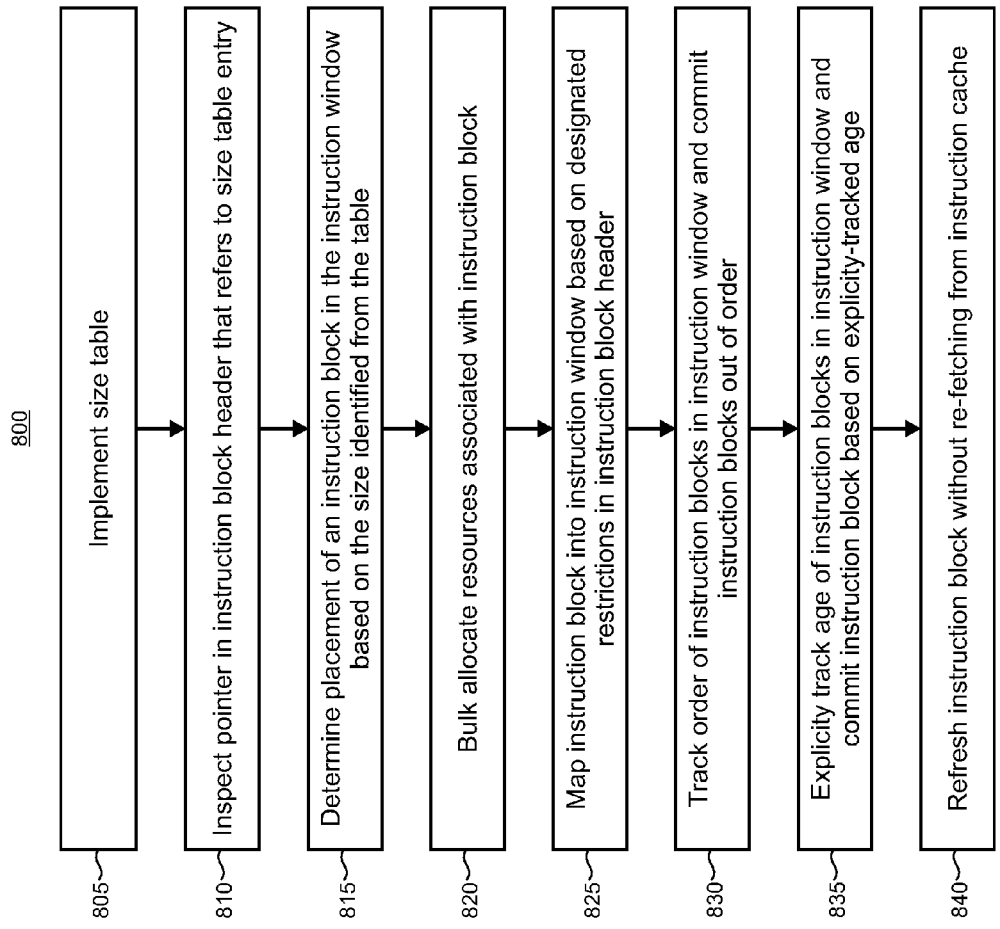

FIG. 8 is a flowchart of an illustrative method 800 that may be performed by an instruction block-based microarchitecture. In step 805, a size table is implemented. As discussed above, the size table may be implemented using one of logic, register, memory, code stream, or other suitable construct and may include sizes that correspond to those which are commonly utilized in a distribution of instruction blocks utilized by a given program. In step 810, an instruction block header is inspected for a pointer that refers to an entry in the size table. In step 815, the size identified by the table entry is used to determine placement of the instruction block within the instruction window.

In step 820, resources associated with the instruction block are bulk allocated. Restrictions designated in the instruction block header are used when mapping the instruction block in the instruction window in step 825. These may include, for example, restrictions on alignment and the capacity of the instruction window to buffer instruction blocks. In step 830, the order of the instruction blocks in the instruction window is tracked by the control unit and blocks may be committed out of order in some situations. For example, rather than use a circular buffer of instruction blocks in which blocks are handled based on their position in the instruction window, blocks can be prioritized so that heavily used, or particularly important instruction blocks are handled out of order which can increase processing efficiency.

In step 835, the age of instruction blocks can be explicitly tracked and instruction blocks can be committed based on such explicitly-tracked age in some cases. The instruction block is refreshed in step 840 (that is, reused without having to re-fetch the instruction block from the instruction cache).

Figure 9:
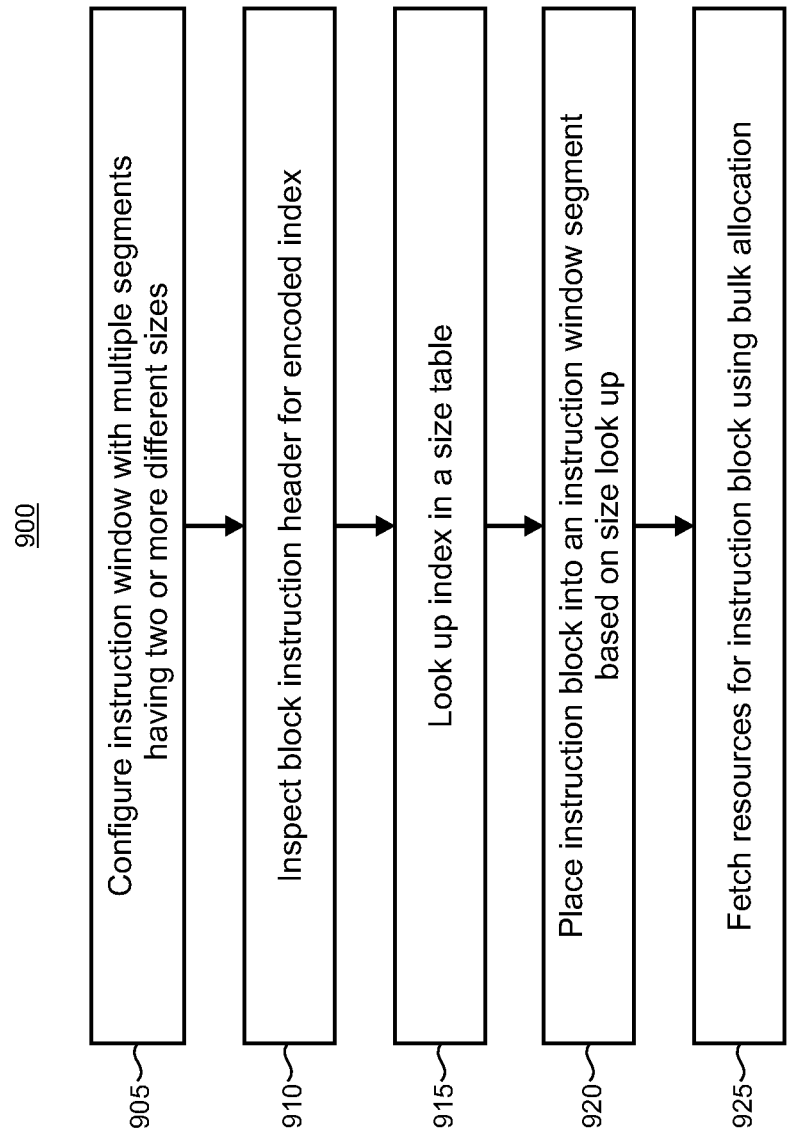

FIG. 9 is a flowchart of an illustrative method 900 that may be performed by a control unit disposed in a processor core. In step 905, the instruction window is configured with multiple segments that have two or more different sizes in a similar manner to that described above. In step 910, the block instruction header is inspected for an index that is encoded therein. A look up is performed in the size table using the index in step 915 and the instruction block is placed into an instruction window segment that is suitable for the particular size of the block, based on the size look up, in step 920. Resources associated with the instruction block are fetched, in step 925, using bulk allocation.

Figure 10:
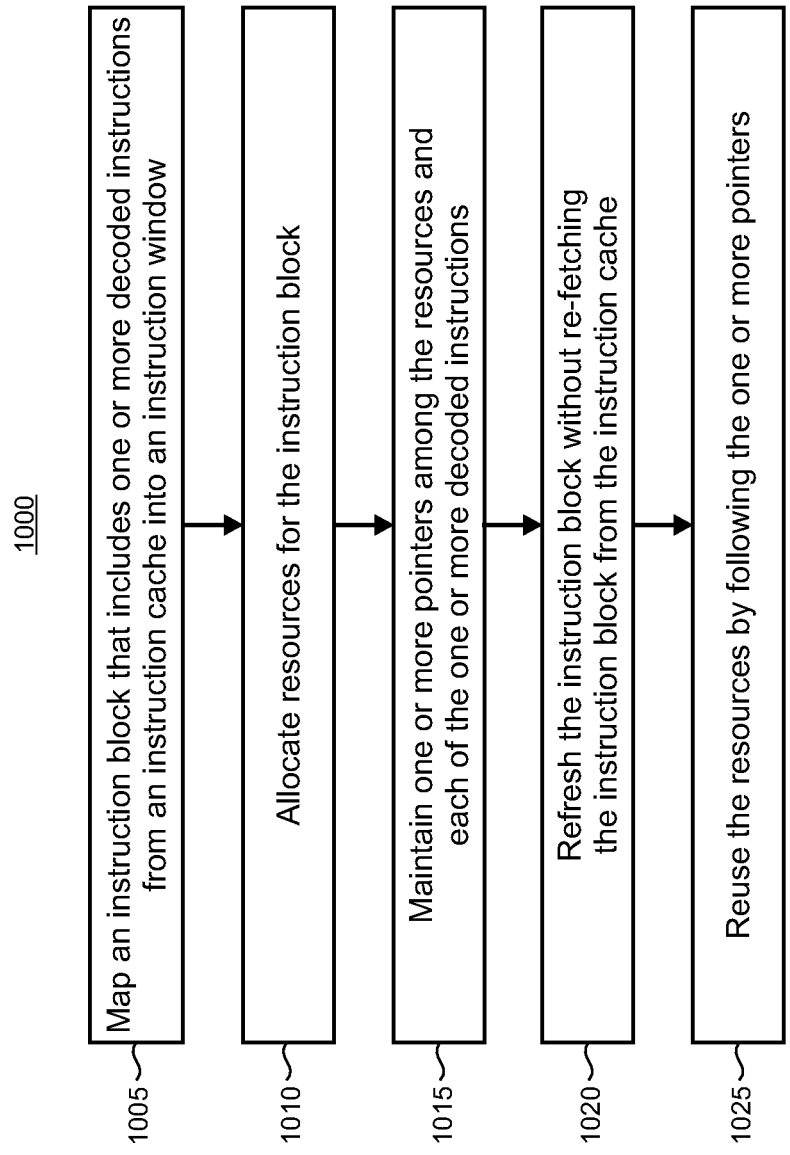

FIG. 10 is a flowchart of an illustrative method 1000 for managing instruction blocks in an instruction window disposed in a processor core. In step 1005, an instruction block is mapped from the instruction cache into the instruction window. The instruction block includes one or more decoded instructions. Resources that are associated with each of the instructions in the instruction block are allocated in step 1010. The resources typically include control bits and operands and the allocation may be performed using a bulk allocation process in which all of the resources are obtained or fetched en masse.

Instead of tightly coupling the resources and instructions, the instruction window and operand buffers are decoupled so that they can be operated independently by maintaining one or more pointers among the resources and the decoded instructions in the block, as shown in step 1015. When an instruction block is refreshed in step 1020 (that is, reused without having to re-fetch the instruction block from the instruction cache), then the resources can be reused by following the pointers back to an original control state in step 1025.

Such decoupling may provide increased processor core efficiency, particularly when instruction blocks are refreshed without re-fetching as typically occurs, for example, when a program executes in a tight loop and instructions are repeatedly utilized. By establishing control state through the pointers, the resources are effectively pre-validated without additional expenditure of processing cycles and other costs. Such efficiency increases may also be compounded when multiple processor cores are composed into a large scale array.

Figure 11:
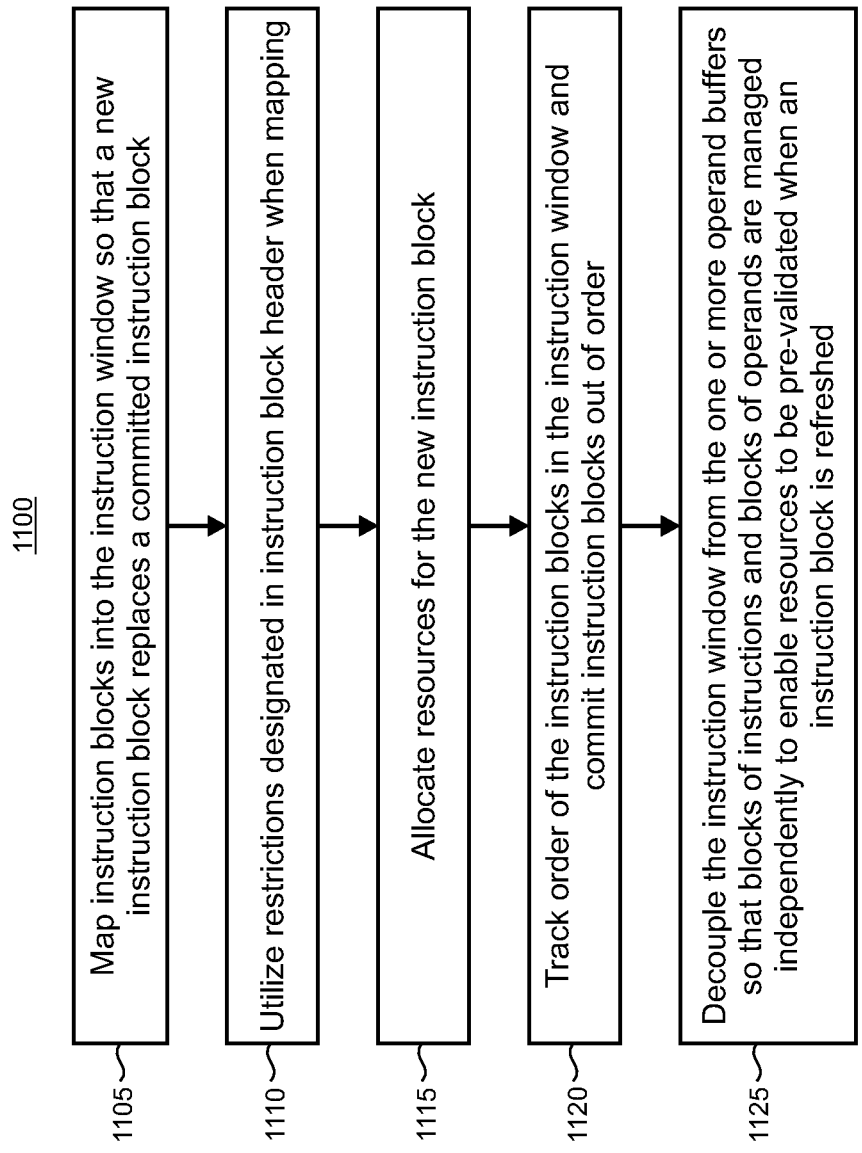

FIG. 11 is a flowchart of an illustrative method 1100 that may be performed by an instruction block-based microarchitecture. In step 1105, instruction blocks are mapped into the instruction window in a manner in which a new instruction block replaces a committed instruction block. The mapping may be subject to various restrictions that are designated in the header of the instruction block, for example, restrictions on alignment and the capacity of the instruction window to buffer instruction blocks, as indicated in step 1110. Resources are allocated in step 1115 for the new instruction block, which typically is implemented using a bulk allocation process, as described above.

In step 1120, the order of the instruction blocks in the instruction window is tracked by the control unit and blocks may be committed out of order in some situations. For example, rather than use a circular buffer of instruction blocks in which blocks are handled based on their position in the instruction window, blocks can be prioritized so that heavily used, or particularly important instruction blocks are handled out of order which can increase processing efficiency.

In step 1125, the instruction window is decoupled from the operand buffer so that, for example, blocks of instructions and blocks of operands are managed independently (i.e., without using a strict correspondence between instructions and operands). As noted above, the decoupling increases efficiency by enabling resources to be pre-validated when an instruction block is refreshed.

Figure 12:
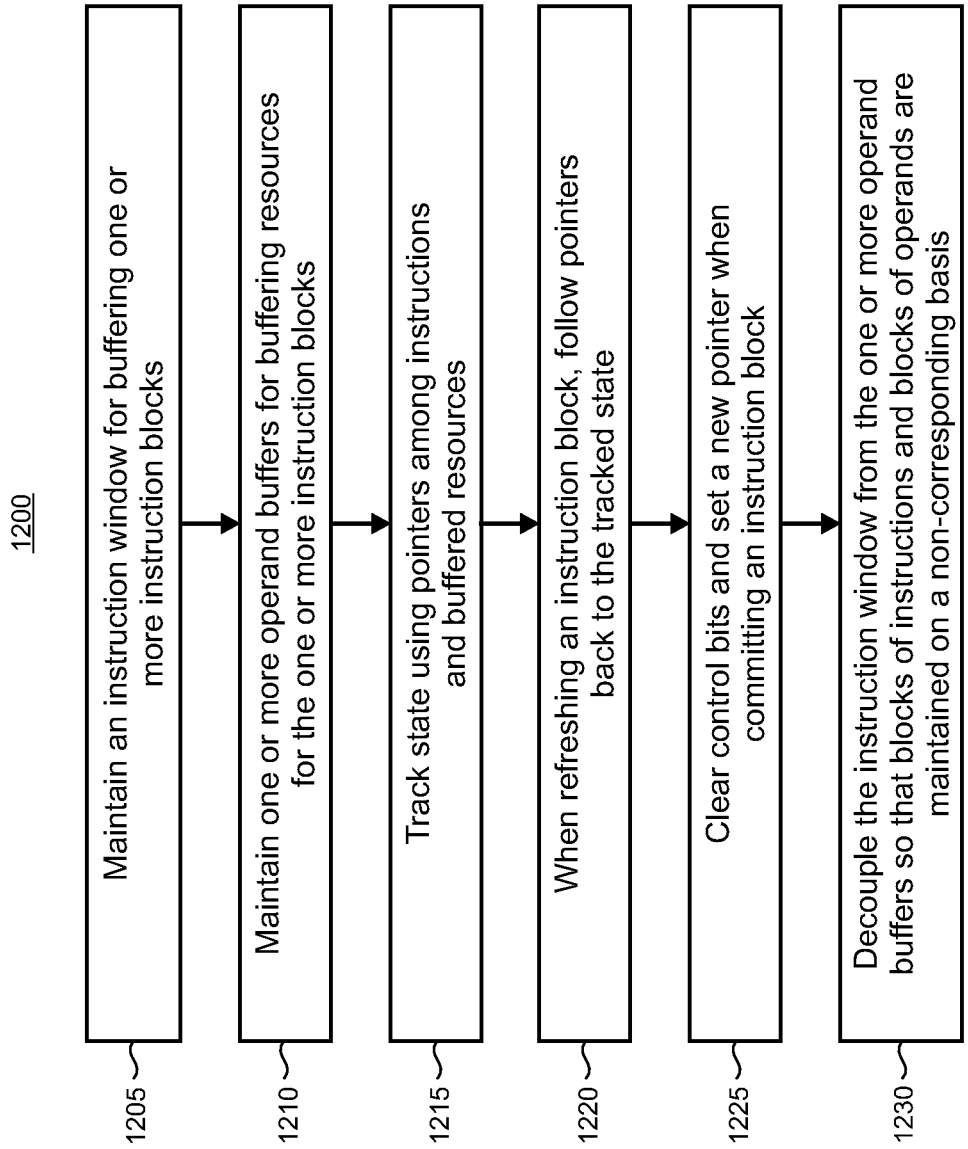

FIG. 12 is a flowchart of an illustrative method 1200 that may be performed by a control unit disposed in a processor core. In step 1205, an instruction window is maintained for buffering one or more instruction blocks. One or more operand buffers are maintained in step 1210 for buffering resources associated with the instructions in the instruction block. As noted above, resources typically include control bits and operands. State is tracked using pointers among the instructions and the resources in step 1215.

When an instruction block is refreshed, in block 1220, the pointers can be followed back to the tracked state. In step 1225, when an instruction blocks commits, the control bits in the operand buffer are cleared and a new pointer is set. As with the method discussed above, the instruction window and operand buffers are decoupled so that blocks of instructions and blocks of operands are maintained by the control unit on a non-corresponding basis, in step 1230.

Figure 13:
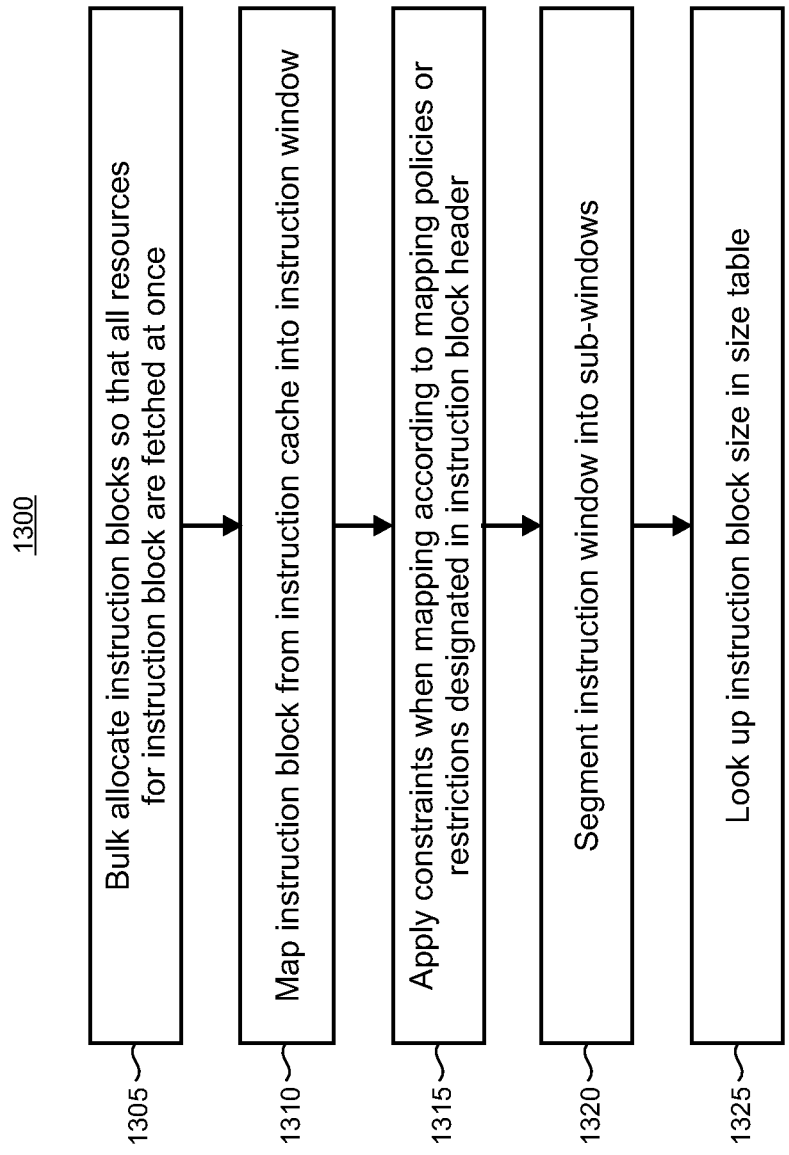

FIG. 13 is a flowchart of an illustrative method 1300 for managing instruction blocks in an instruction window disposed in a processor core. In step 1305, instruction blocks are allocated using a bulk allocation process in which instructions in the block and all the resources associated with the instructions are fetched at once (i.e., en masse). In comparison to conventional architectures in which instructions and resources are repeatedly fetched in smaller chunks, the bulk allocation here enables all of the instructions in the block to be managed simultaneously and consistently which can improve efficiency of processor core operations. This improvement may be even more significant in situations where a given programming construct (e.g., one that minimizes branching) enables the compiler to generate relatively large instruction blocks. For example, in some implementations, an instruction block may contain up to 128 instructions.

The bulk allocation of instruction blocks also enhances processor core efficiency through the refresh feature in which instruction blocks are reused without re-fetching as typically occurs, for example, when a program executes in a tight loop and instructions branch back on themselves. Such efficiency increases may also be compounded when multiple processor cores are composed into a large scale array. When refreshing an instruction block, the instructions are left in place and only the valid bits in the operand buffer and load/store queue are cleared. This enables the fetching of the refreshed instruction blocks to be bypassed entirely.

The bulk allocation of instruction blocks also enables additional processing efficiencies when a group of instructions and resources are in place. For example, operands and explicit messages may be sent from one instruction in the block to another. Such functionality is not enabled in conventional architectures because one instruction is unable to send anything to another instruction that has yet to be allocated. Instructions that generate constants can also pin values in the operand buffers so that they remain valid after refresh so they do not need to be regenerated each time the instruction block executes.

When instruction blocks are mapped into the instruction window, in step 1310, they are subject to constraints that may be applied by mapping policies, restrictions designated in the block header, or both in step 1315. In some cases, the policies can be set by a compiler depending on the particular requirements of a given program. The designated restrictions can include, for example, restrictions on alignment and the restrictions on the capacity of the instruction window to buffer instruction blocks.

In step 1320, the instruction window can, in some implementations, be segmented into sub-windows of the same size or different sizes. As instruction block sizes are often randomly or unevenly distributed for a given program, such variation in the segmented sub-windows may more efficiently accommodate a given distribution of instruction block sizes to thereby increase instruction packing density in the instruction window. The segmentation may also be dynamically performed in some scenarios depending on the distribution of block sizes that is being currently handled by the processor core.

In some implementations, the instruction block header may encode an index or include a pointer to a size table that is implemented using one of logic, register, memory, or code stream. The size table can include instruction block size entries so that an instruction block size can be looked up from the table in step 1325. Use of the encoded index and size table may enhance instruction packing density in an instruction block by affording more granularity in available block sizes to reduce the occurrence of nops (no operations) when a block includes a relatively small number of instructions when implementing branching, for example.

Figure 14:
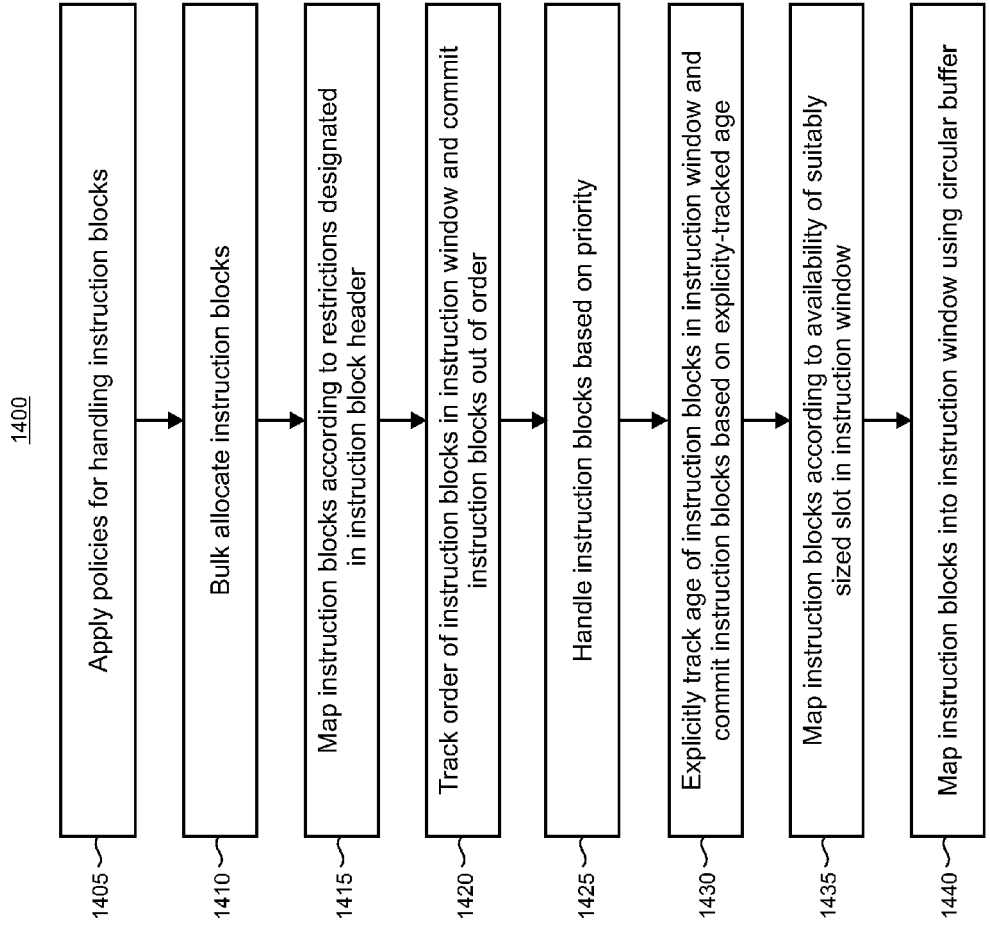
Figure 15:
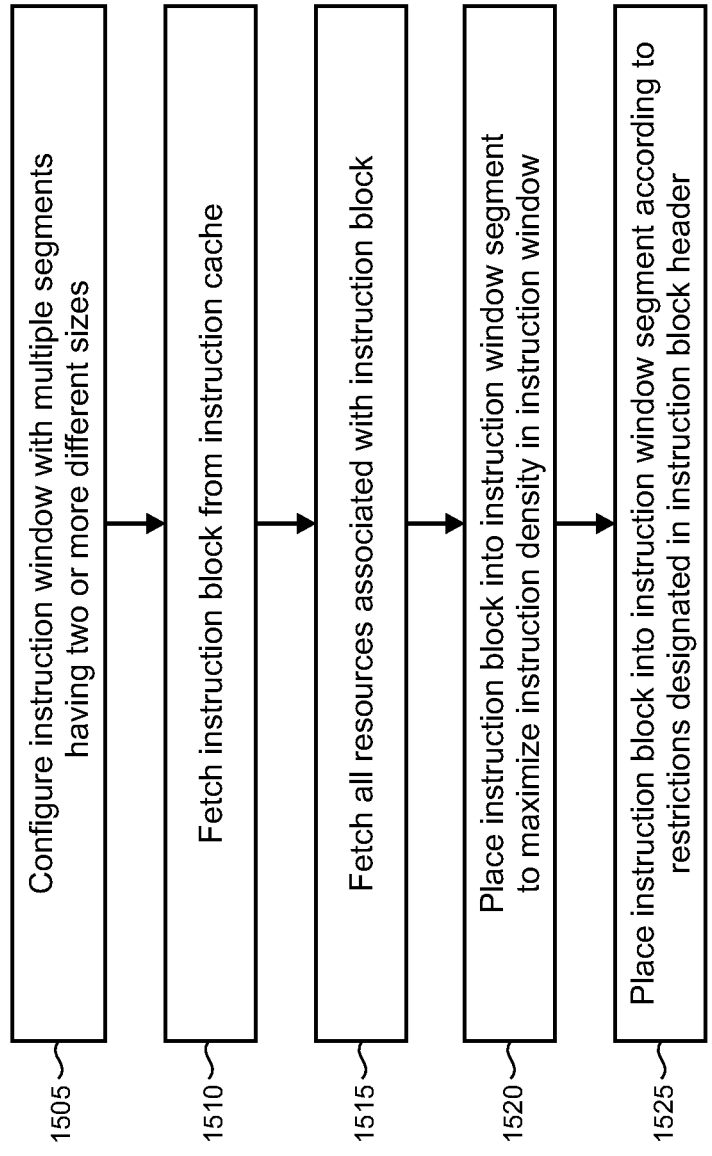

FIG. 14 is a flowchart of an illustrative method 1400 that may be performed by an instruction block-based microarchitecture. In step 1405, a control unit in a processor core applies policies for handling instruction blocks. The instruction blocks are allocated in step 1410 using a bulk allocation process described above in which instructions and all associated resources are fetched at once. In step 1415, instruction blocks are mapped into the instruction window in which the mapping may be subject to various restrictions, such as restrictions on alignment and restrictions on the capacity of the instruction window to buffer instruction blocks that are designated in the header of the instruction block, as described above.

In step 1420, a policy may be applied that includes tracking the order of the instruction blocks in the instruction window by the control unit. Blocks may be committed out of order in some situations, for example, rather than using a circular buffer of instruction blocks in which blocks are handled based on their position in the instruction window. In step 1425, a policy may be applied that includes handling blocks based on priority (which may be designated by the compiler in some scenarios) so that blocks which are heavily used, or are particularly important, are handled out of order which can further increase processing efficiency.

In step 1430, a policy may be applied that includes explicitly tracking the age of instruction blocks and instruction blocks can be committed based on such explicitly-tracked age in some cases. In step 1435, a policy may be applied that includes mapping instruction blocks according to the availability of a suitably sized slot in the instruction window (or a segment of the window). In step 1440, a policy may be applied that includes mapping instruction blocks into the instruction window using a circular buffer.

In some implementations, various combinations of policies may be utilized in order to further enhance processor core efficiency. For example, the control unit may dynamically toggle among policies to apply a policy that provides more optimal operations for a given instruction block or group of instruction blocks. For example, in some scenarios, it may be more efficient to use a circular buffering technique in which instruction blocks are handled in order in a contiguous manner. In other scenarios, out of order and age-based handling may provide more optimal operations.

FIG. 14 is a flowchart of an illustrative method 1500 that may be performed by a control unit disposed in a processor core. In step 1505, the instruction window is configured with multiple segments that have two or more different sizes in a similar manner to that described above. In step 1510, an instruction block is fetched and all its associated resources are fetched in step 1515.

In step 1520, an instruction block is placed in a suitable segment of the window that maximizes instruction density in the window. For example, if the compiler produces a distribution of block sizes that includes a relatively large number of blocks with low instruction count (e.g., to implement program branching and the like), then the instruction window may have a segment that is specifically sized for small instruction blocks. Similarly, if there is a relatively large number of high instruction count blocks (e.g., for scientific and similar applications), then a segment may be specifically sized for such larger instruction blocks. Thus, the instruction window segment sizing can be adjusted according to a particular size distribution or be dynamically adjusted in some situations when the distribution changes. In block 1525, instruction blocks may be subject to restrictions designated in the instruction block header, as discussed above.

Various exemplary embodiments of the present age-based management of instruction blocks in a processor instruction window are now presented by way of illustration and not as an exhaustive list of all embodiments. An example includes a method for managing instruction blocks in an instruction window disposed in a processor core, comprising: explicitly tracking ages of instruction blocks currently mapped in the instruction window; mapping a new instruction block into the available slot in the instruction window; executing the new instruction block to commit the instructions in the instruction block atomically; and executing, in order of their explicitly-tracked ages, the currently mapped instruction blocks to commit their respective instructions atomically. In another example the method further includes performing bulk allocation for each instruction block that is fetched from an instruction cache to obtain resources that are associated with each of the instructions in the block. In another example, the method further includes performing the explicit tracking by maintaining an age-ordered list of fetched instruction blocks in which the age-ordered list includes a pointer for each instruction block to the instruction window. In another example, the method further includes maintaining a list of available slots in the instruction window and addresses of the available slots. In another example, the method further includes identifying an instruction block for commitment and searching the age-ordered list for a match. In another example, the method further includes refreshing an instruction block and not re-fetching the instruction block when a match is found.

A further example includes an instruction block-based microarchitecture, comprising: a control unit; one or more operand buffers under control of the control unit; and an instruction window configured to store decoded instruction blocks to be under control of the control unit in which the control includes operations to: buffer instruction blocks in the instruction window so that a new instruction block replaces a committed instruction block, in which the buffering is performed with contiguous instruction block replacement or non-contiguous instruction block replacement, when buffering with contiguous replacement, operate the instruction window as a circular buffer and replace instruction blocks based on their order in the instruction window, when buffering with non-contiguous replacement, replace instruction blocks out of order in the instruction window. In another example, the instruction block-based microarchitecture further includes a configuration to perform a bulk allocation of resources for all instructions in an instruction block, the resources including one of control bits or operands that are buffered in the operand buffers. In another example, the instruction block-based microarchitecture further includes a configuration to track an age of each instruction block. In another example, the instruction block-based microarchitecture further includes a configuration to use an age vector to track the age of each instruction block. In another example, the instruction block-based microarchitecture further includes a configuration to commit an instruction block based on its tracked age. In another example, the instruction block-based microarchitecture further includes a configuration to track priority of an instruction block and committing an instruction block based on its tracked priority. In another example, the instruction block-based microarchitecture further includes a configuration to refresh an instruction block based on its tracked priority. In another example, the refreshing comprises reusing the instruction block without re-fetching the instruction block from an instruction cache.

A further example includes a control unit disposed in a processor core that is arranged to perform a method for instruction block management, comprising: tracking state of instruction blocks buffered in an instruction window in which the state includes age or priority; maintaining a list of instruction blocks based on the tracked state; identifying an instruction block for mapping into the instruction window; checking the list of instruction blocks for a match to the identified instruction block; and refreshing a matching instruction block in the list. In another example, the control unit further includes fetching an instruction block from an instruction cache and mapping the fetched instruction block into an instruction window when a match is not found. In another example, the control unit further includes tracking the age using a vector. In another example, the control unit further includes maintaining the priority based on a priority identifier generated by a compiler. In another example, the control unit further includes maintaining a logical instruction window that encompasses a plurality of processor cores and tracking state of instruction blocks buffered in the logical instruction window. In another example, the control unit further includes an on-chip network that facilitates communications among the plurality of processor cores.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed:

1. A method for managing instruction blocks in an instruction window disposed in a processor core, comprising:
    explicitly tracking ages of instruction blocks currently mapped in the instruction window in which the explicit tracking is performed independently from instruction block order within the instruction window;
    mapping a new instruction block into an available slot in the instruction window;
    committing instructions in the new instruction block atomically; and
    executing, in order of their explicitly-tracked ages, the currently mapped instruction blocks to commit their respective instructions atomically.

2. The method of claim 1 further including performing bulk allocation for each instruction block that is fetched from an instruction cache to obtain resources that are associated with each of the instructions in the block.

3. The method of claim 1 further including performing the explicit tracking by maintaining an age-ordered list of fetched instruction blocks in which the age-ordered list includes a pointer for each instruction block to the instruction window.

4. The method of claim 3 further including maintaining a list of available slots in the instruction window and addresses of the available slots.

5. The method of claim 3 further including identifying an instruction block for commitment and searching the age-ordered list for a match.

6. The method of claim 5 further including refreshing an instruction block and not re-fetching the instruction block when a match is found.

7. An instruction block-based processor, comprising:
a control unit;
one or more operand buffers under control of the control unit; and
an instruction window configured to store decoded instruction blocks to be under control of the control unit in which the control includes operations to:
buffer instruction blocks in the instruction window so that a new instruction block replaces a committed instruction block, in which the buffering is performed with contiguous instruction block replacement or non-contiguous instruction block replacement,
when buffering with contiguous replacement, operate the instruction window as a circular buffer and replace instruction blocks based on their order in the instruction window,
when buffering with non-contiguous replacement, replace instruction blocks out of order in the instruction window in which blocks are replaced based on an explicitly-tracked ages of instruction blocks, the explicit tracking being performed independently from instruction block order within the instruction window.

8. The instruction block-based processor of claim 7 further including a configuration to perform a bulk allocation of resources for all instructions in an instruction block, the resources including one of control bits or operands that are buffered in the operand buffers.

9. The instruction block-based processor of claim 7 further including a configuration to track an age of each instruction block.

10. The instruction block-based processor of claim 9 further including a configuration to use an age vector to track the age of each instruction block.

11. The instruction block-based processor of claim 9 further including a configuration to commit an instruction block based on its tracked age.

12. The instruction block-based processor of claim 7 further including a configuration to track priority of an instruction block and committing an instruction block based on its tracked priority.

13. The instruction block-based processor of claim 12 further including a configuration to refresh an instruction block based on its tracked priority.

14. The instruction block-based processor of claim 13 in which the refreshing comprises reusing the instruction block without re-fetching the instruction block from an instruction cache.

15. A control unit disposed in a processor core that is arranged to perform a method for instruction block management, comprising:
Explicitly tracking state of instruction blocks buffered in an instruction window in which the state includes age or priority in which the explicit tracking is performed independently from instruction block order within the instruction window;
maintaining a list of instruction blocks based on the tracked state;
identifying an instruction block for mapping into the instruction window;
checking the list of instruction blocks for a match to the identified instruction block; and
refreshing a matching instruction block in the list.

16. The control unit of claim 15 further including fetching an instruction block from an instruction cache and mapping the fetched instruction block into an instruction window when a match is not found.

17. The control unit of claim 15 further including tracking the age using a vector.

18. The control unit of claim 15 further including maintaining the priority based on a priority identifier generated by a compiler.

19. The control unit of claim 15 further including maintaining a logical instruction window that encompasses a plurality of processor cores and tracking state of instruction blocks buffered in the logical instruction window.

20. The control unit of claim 19 further including an on-chip network that facilitates communications among the plurality of processor cores.

21. The method of claim 1 in which instruction block sizes are indicated in a header using a pointer to a size table that is expressed using one of logic, register, memory, or code stream.

* * * * *